(12) United States Patent
Phillips et al.

(10) Patent No.: US 9,955,203 B2
(45) Date of Patent: Apr. 24, 2018

(54) RECORDING DEVICE AND METHOD FOR EFFICIENT NETWORK PERSONAL VIDEO RECORDER MANIPULATION THROUGH ADAPTIVE BIT RATE STREAMING

(71) Applicant: Ericsson Television Inc., Duluth, GA (US)

(72) Inventors: Chris Phillips, Hartwell, GA (US); Jennifer Ann Reynolds, Duluth, GA (US)

(73) Assignee: ERICSSON AB, Stockholm (SE)

(*) Notice: Subject to any disclaimer, the term of this patent is extended or adjusted under 35 U.S.C. 154(b) by 830 days.

(21) Appl. No.: 14/035,665

(22) Filed: Sep. 24, 2013

(65) Prior Publication Data

US 2015/0089554 A1    Mar. 26, 2015

(51) Int. Cl.
| | |
|---|---|
| *H04N 7/173* | (2011.01) |
| *H04N 21/2747* | (2011.01) |
| *H04N 21/218* | (2011.01) |
| *H04N 21/239* | (2011.01) |
| *H04N 21/262* | (2011.01) |
| *H04N 21/472* | (2011.01) |
| *H04N 21/845* | (2011.01) |
| *H04N 21/2343* | (2011.01) |
| *H04N 21/2662* | (2011.01) |
| *H04N 21/2387* | (2011.01) |
| *H04N 21/231* | (2011.01) |

(52) U.S. Cl.
CPC ... *H04N 21/2747* (2013.01); *H04N 21/21815* (2013.01); *H04N 21/2393* (2013.01); *H04N 21/23439* (2013.01); *H04N 21/26258* (2013.01); *H04N 21/47214* (2013.01); *H04N 21/8456* (2013.01); *H04N 21/2387* (2013.01); *H04N 21/23113* (2013.01); *H04N 21/2662* (2013.01)

(58) Field of Classification Search
CPC ......... H04N 21/2747; H04N 21/21815; H04N 21/23113; H04N 21/2387; H04N 21/2662; H04N 21/2393; H04N 21/26258; H04N 21/47214; H04N 21/8456; H04N 21/23439
USPC ............................................. 725/92, 87, 90
See application file for complete search history.

(56) References Cited

U.S. PATENT DOCUMENTS

| | | | |
|---|---|---|---|
| 9,038,116 B1* | 5/2015 | Knox ................ | H04L 12/2805 709/219 |
| 2006/0174289 A1* | 8/2006 | Theberge ........... | H04N 7/17318 725/87 |
| 2009/0235317 A1 | 9/2009 | Igarashi | |
| 2009/0297129 A1 | 12/2009 | Jenzowsky et al. | |

(Continued)

FOREIGN PATENT DOCUMENTS

| | | |
|---|---|---|
| EP | 2373051 A2 | 10/2011 |
| JP | 10-2011-0076831 | 7/2011 |
| KR | 10-2011-0076831 | 7/2011 |

*Primary Examiner* — Pankaj Kumar
*Assistant Examiner* — Sahar Baig

(57) ABSTRACT

A recording device and a method are described herein that provide a network-based personal video recording service utilizing adaptive bit rate technology for a plurality of users. In operation, the recording device records at a minimum a single bit rate (one set of segmented files) of the broadcast content within each user's network personal video recorder storage unit. Plus, the recording device stores the other bit rates (remaining sets of segmented files) in a central storage location or some other storage location.

21 Claims, 16 Drawing Sheets

(56) References Cited

U.S. PATENT DOCUMENTS

| | | |
|---|---|---|
| 2011/0035775 A1 | 2/2011 | Patel et al. |
| 2011/0107180 A1* | 5/2011 | Markison ............ G06F 11/1092 714/763 |
| 2011/0238789 A1* | 9/2011 | Luby ................ H04N 21/23106 709/219 |
| 2012/0011225 A1* | 1/2012 | Keum .................... H04H 20/40 709/219 |
| 2012/0042090 A1* | 2/2012 | Chen .................... H04L 65/607 709/231 |
| 2012/0117103 A1 | 5/2012 | Farrelly et al. |
| 2012/0117263 A1* | 5/2012 | Xu ...................... H04N 21/2362 709/231 |
| 2012/0290739 A1 | 11/2012 | Melnyk et al. |
| 2013/0060956 A1* | 3/2013 | Nagaraj ............. H04N 21/4384 709/231 |
| 2013/0142499 A1 | 6/2013 | Major et al. |
| 2014/0010517 A1* | 1/2014 | Sheffler .................... H04N 9/79 386/226 |
| 2014/0208314 A1* | 7/2014 | Jeswani .................... G06F 8/65 718/1 |
| 2014/0219638 A1* | 8/2014 | Viveganandhan ....... H04N 5/76 386/298 |
| 2014/0230003 A1* | 8/2014 | Ma ....................... H04N 21/231 725/115 |
| 2014/0237525 A1* | 8/2014 | Rothschild ........... H04N 21/236 725/92 |
| 2015/0261600 A1* | 9/2015 | Iturralde ................. H04L 65/60 714/747 |

* cited by examiner

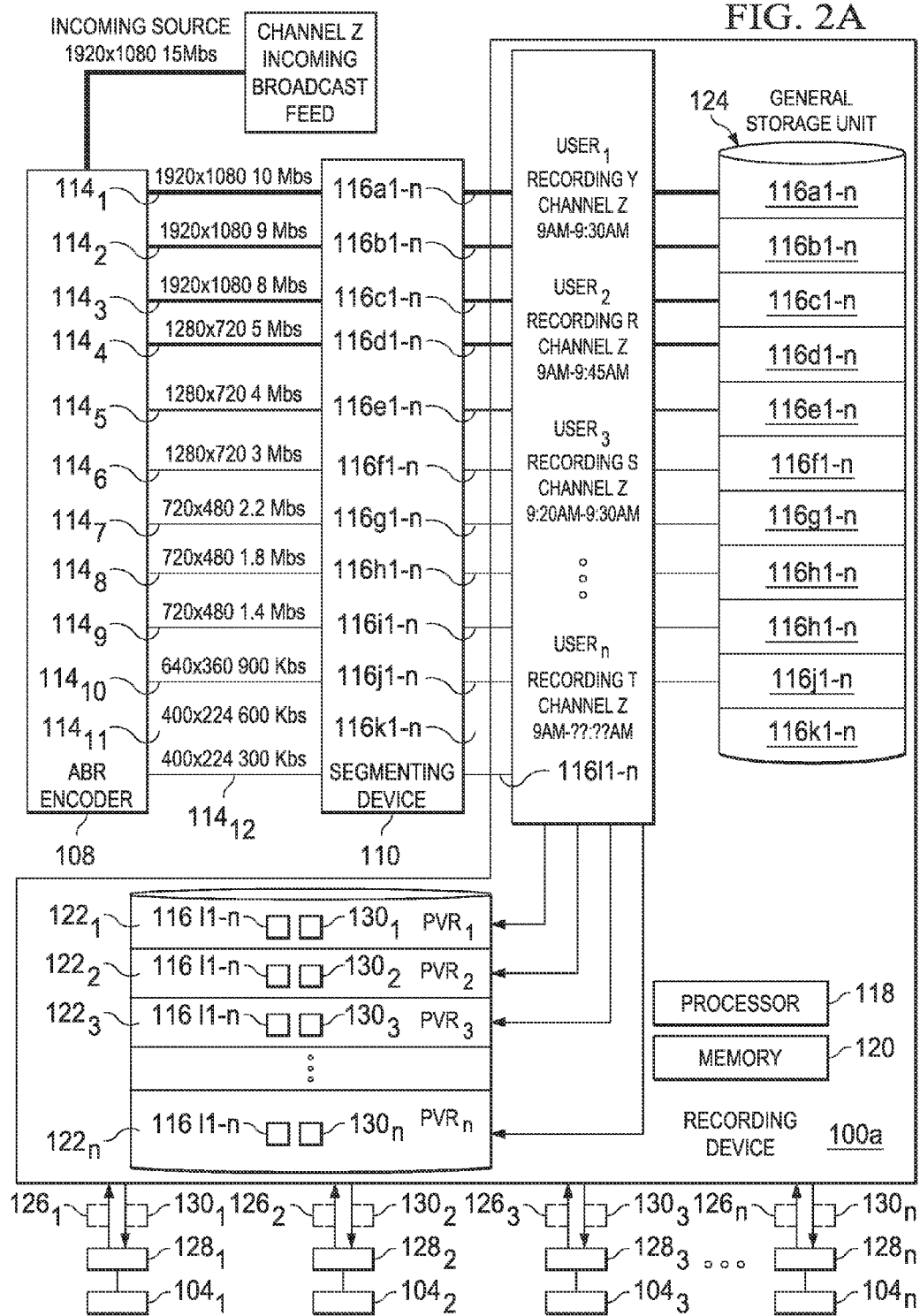

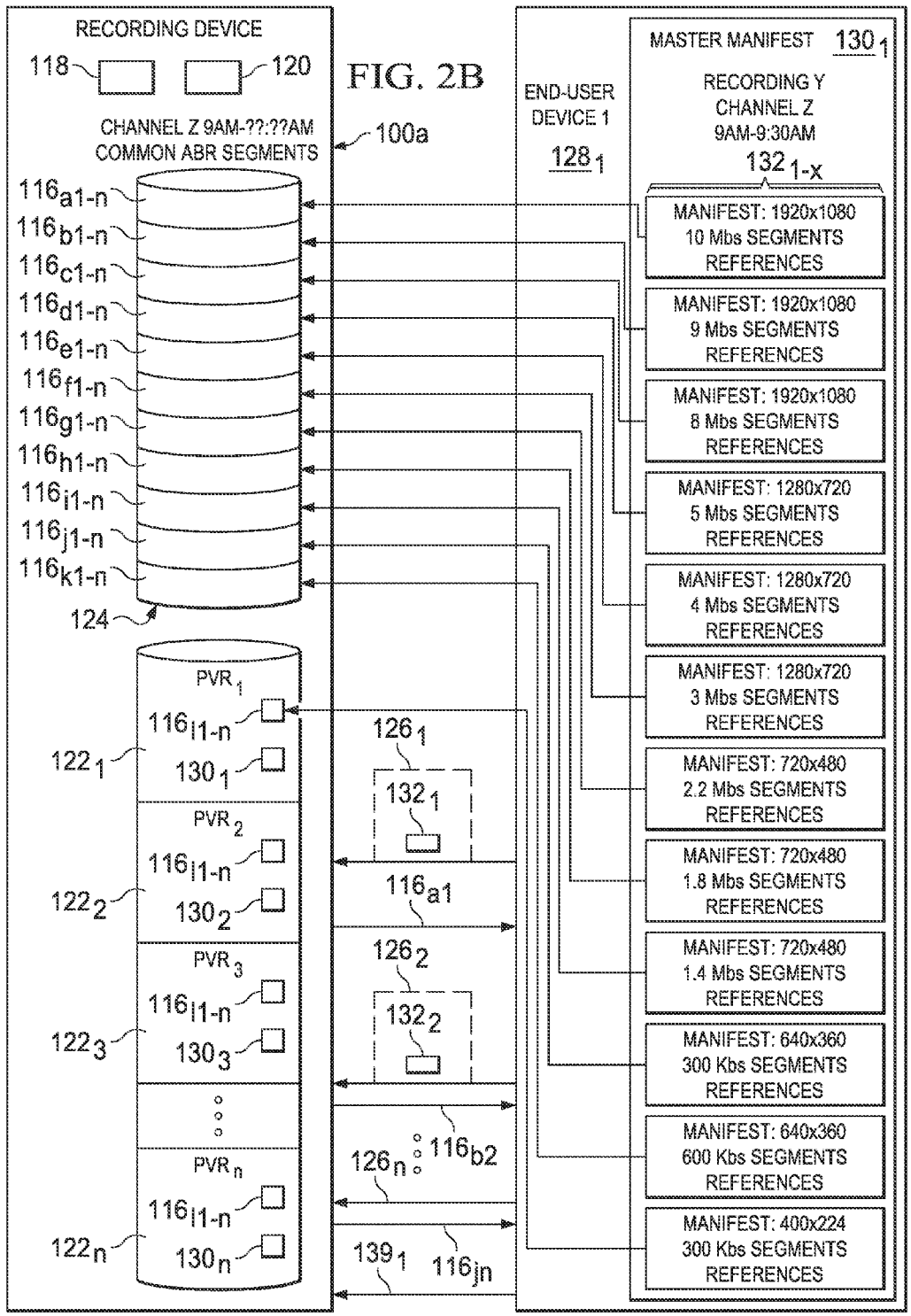

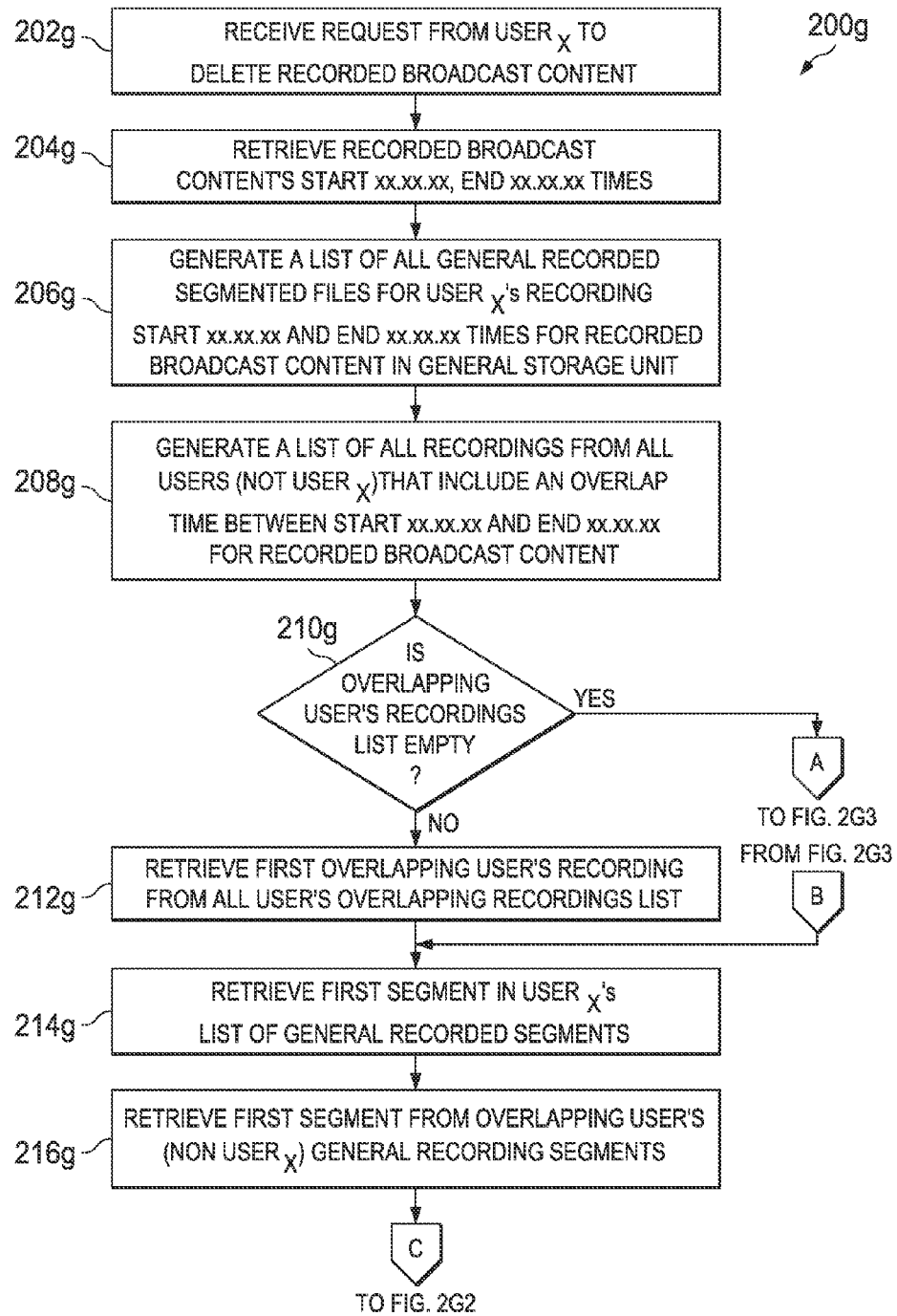

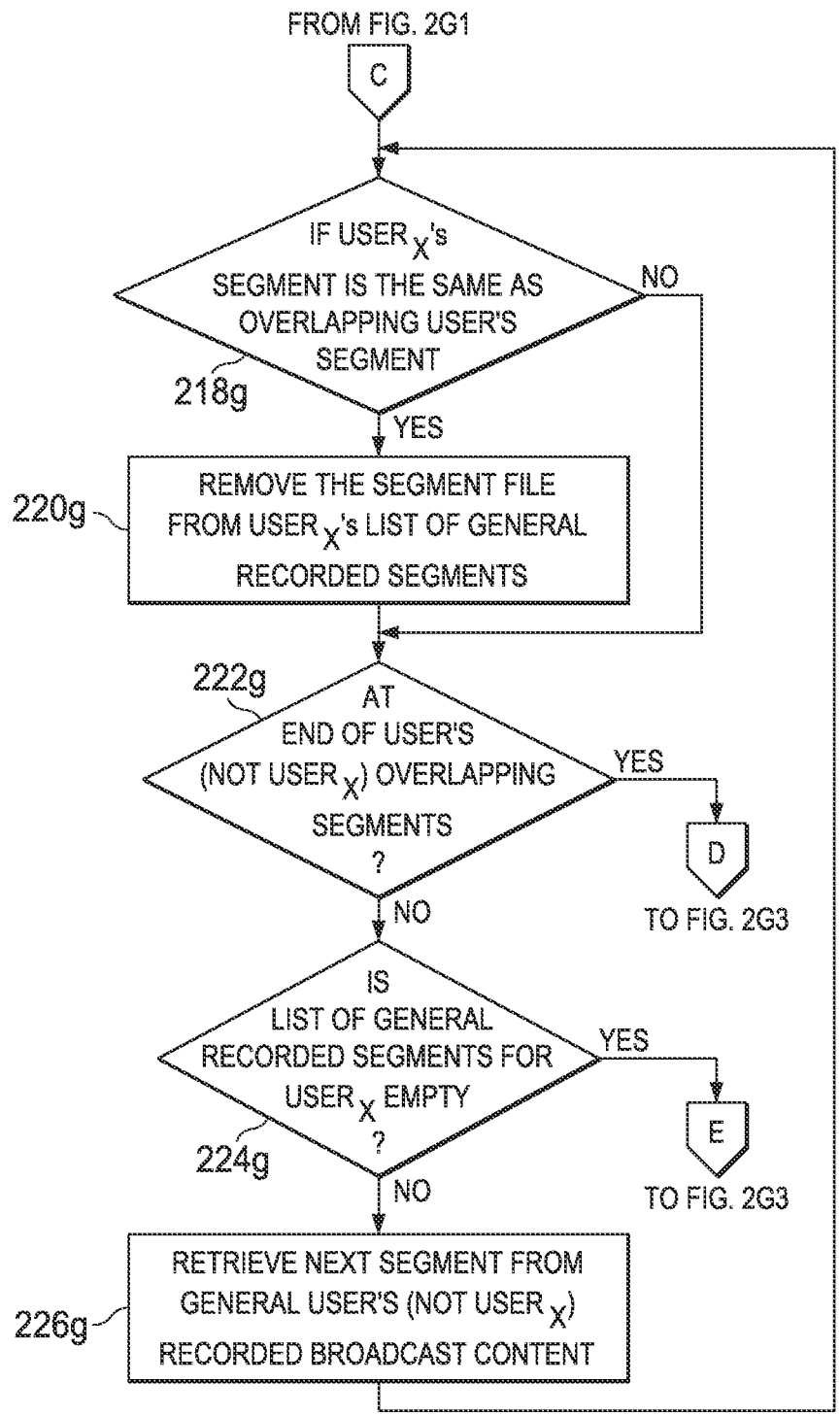
FIG. 2G2

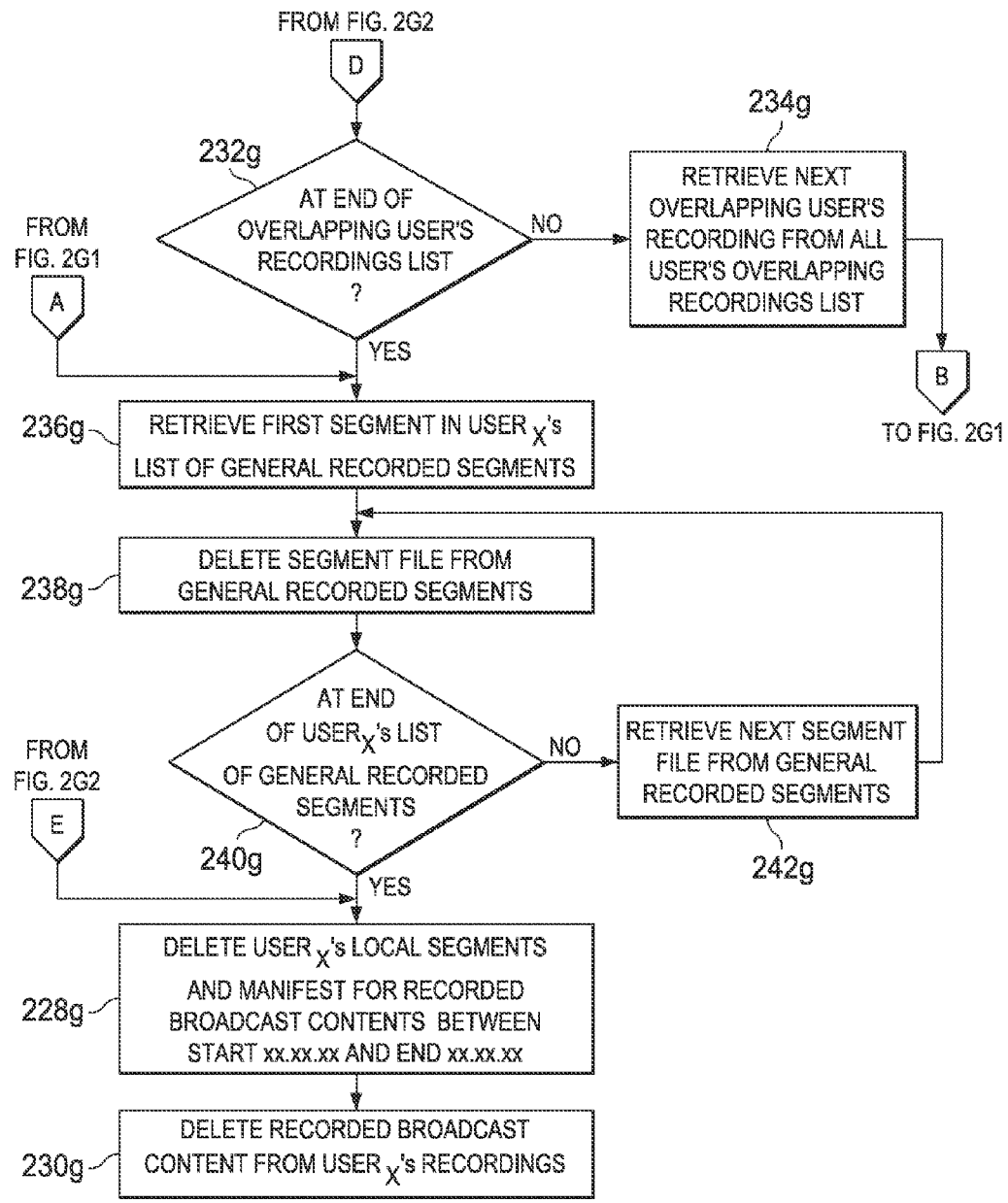
FIG. 2G3

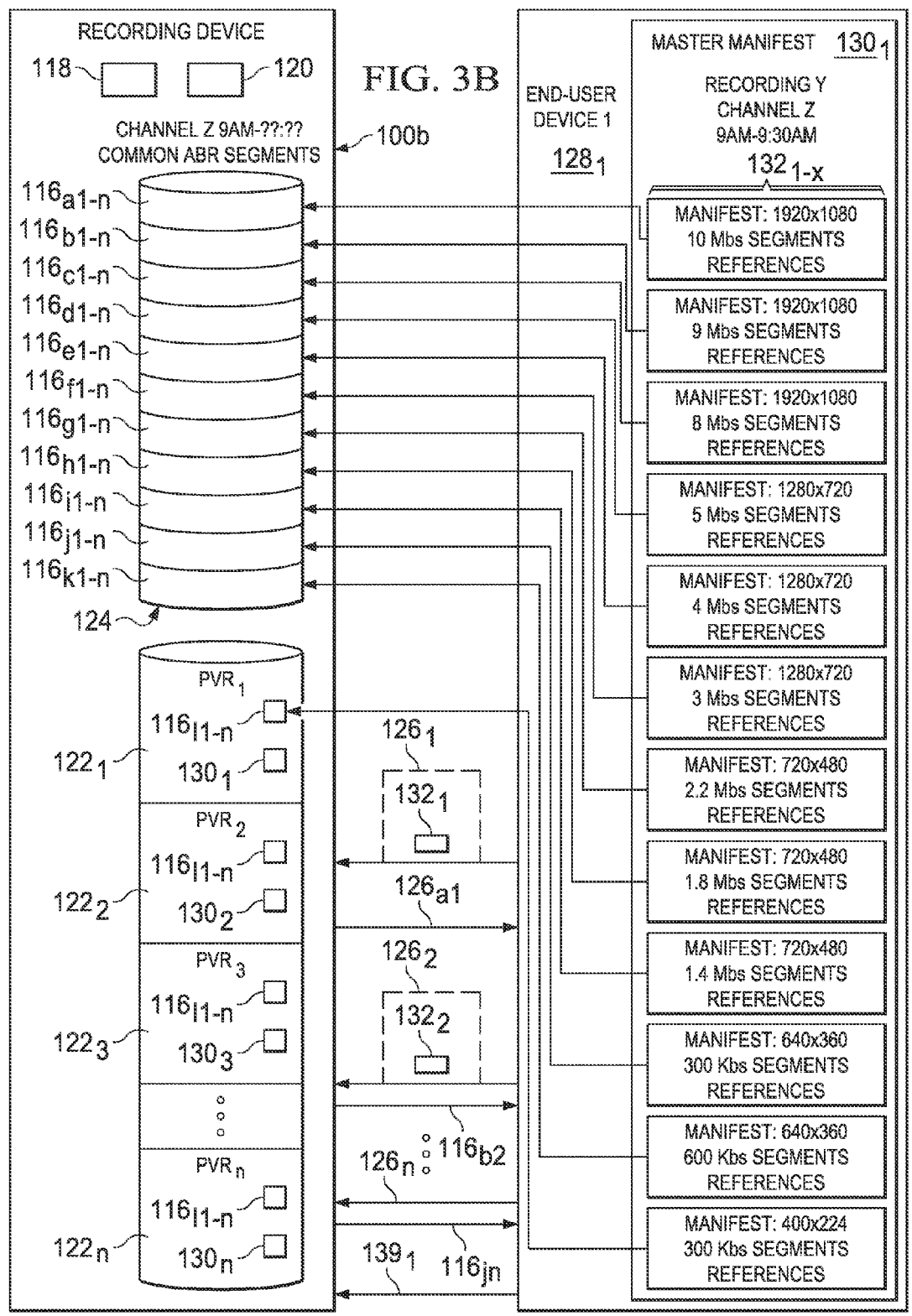

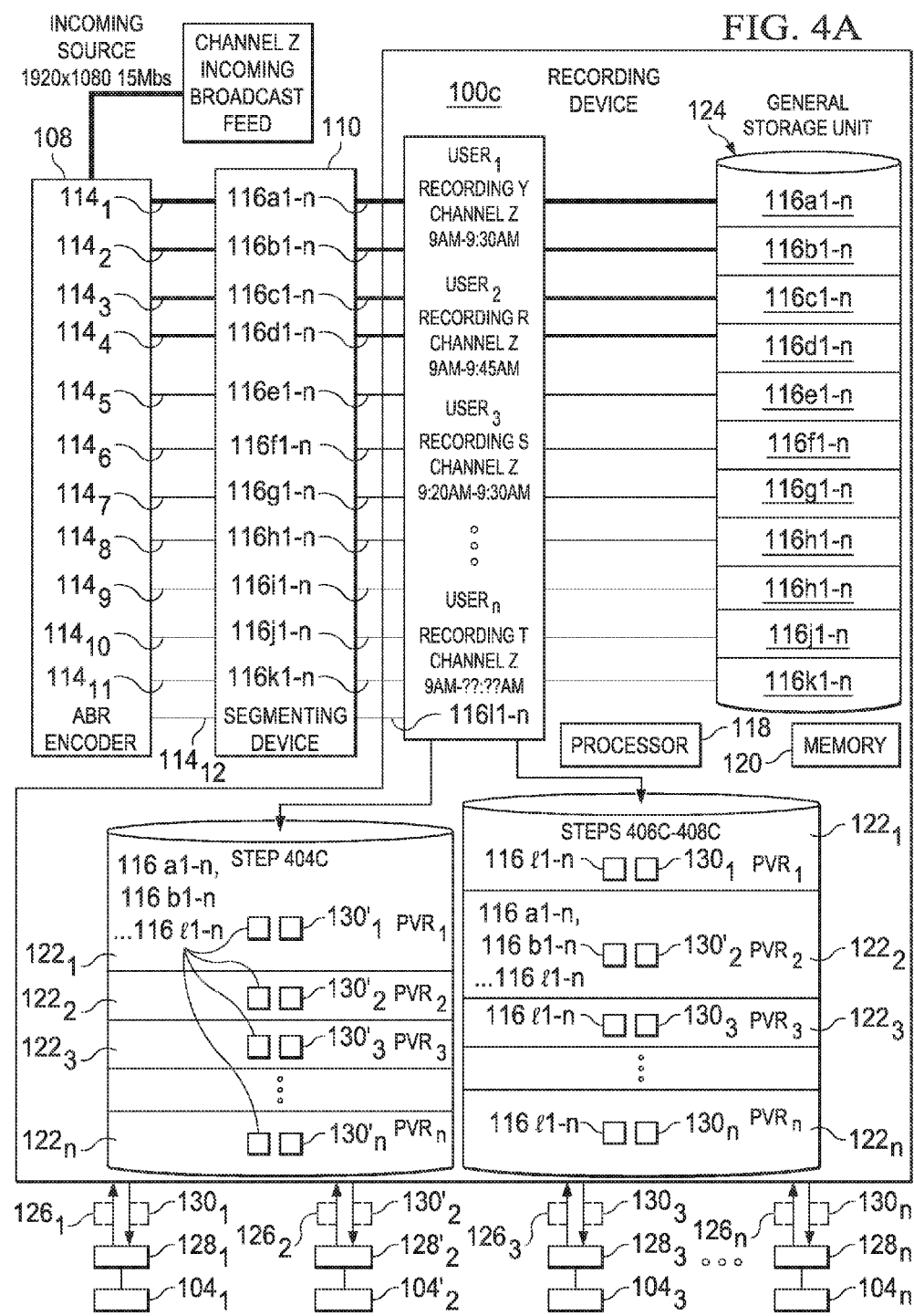

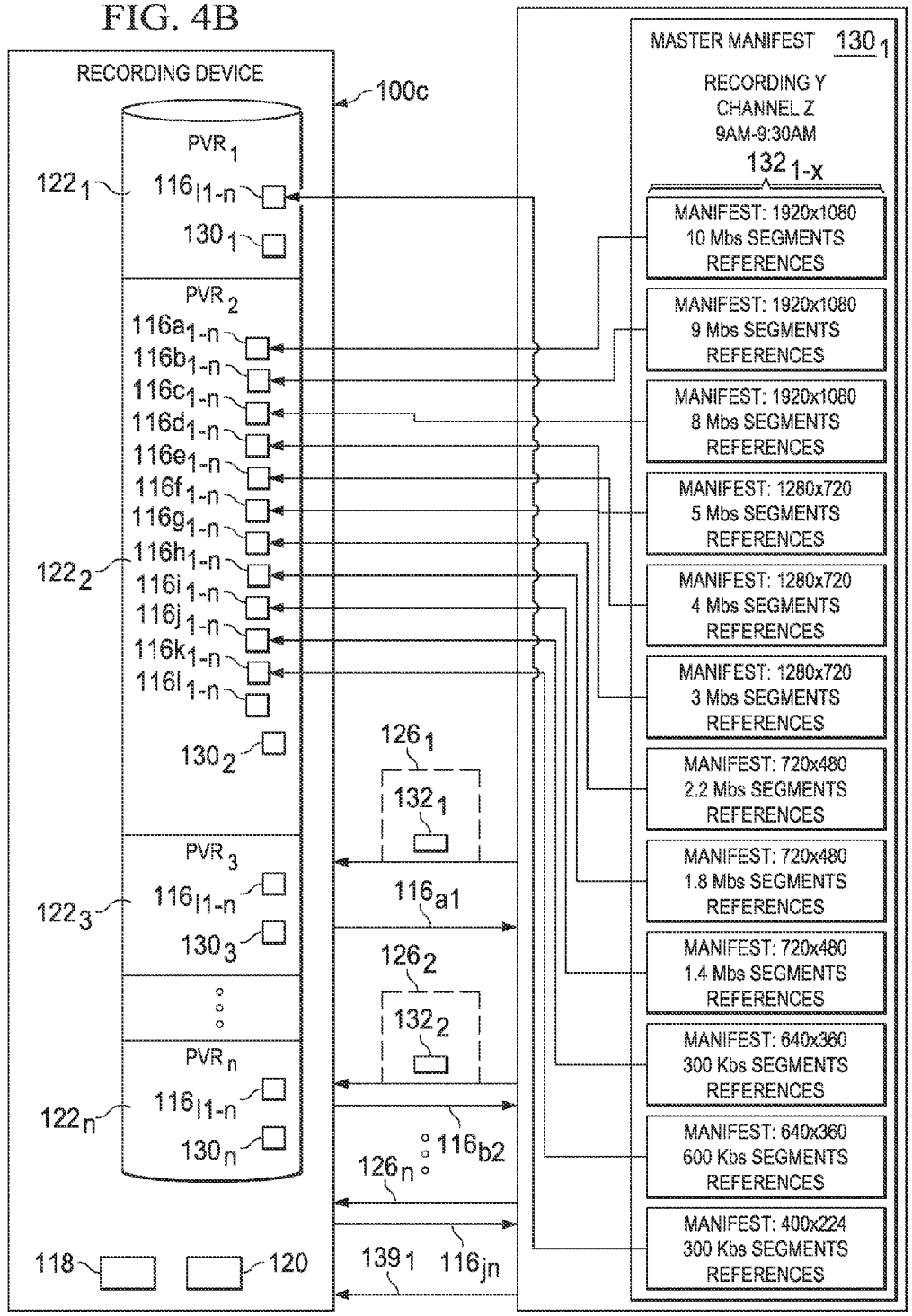

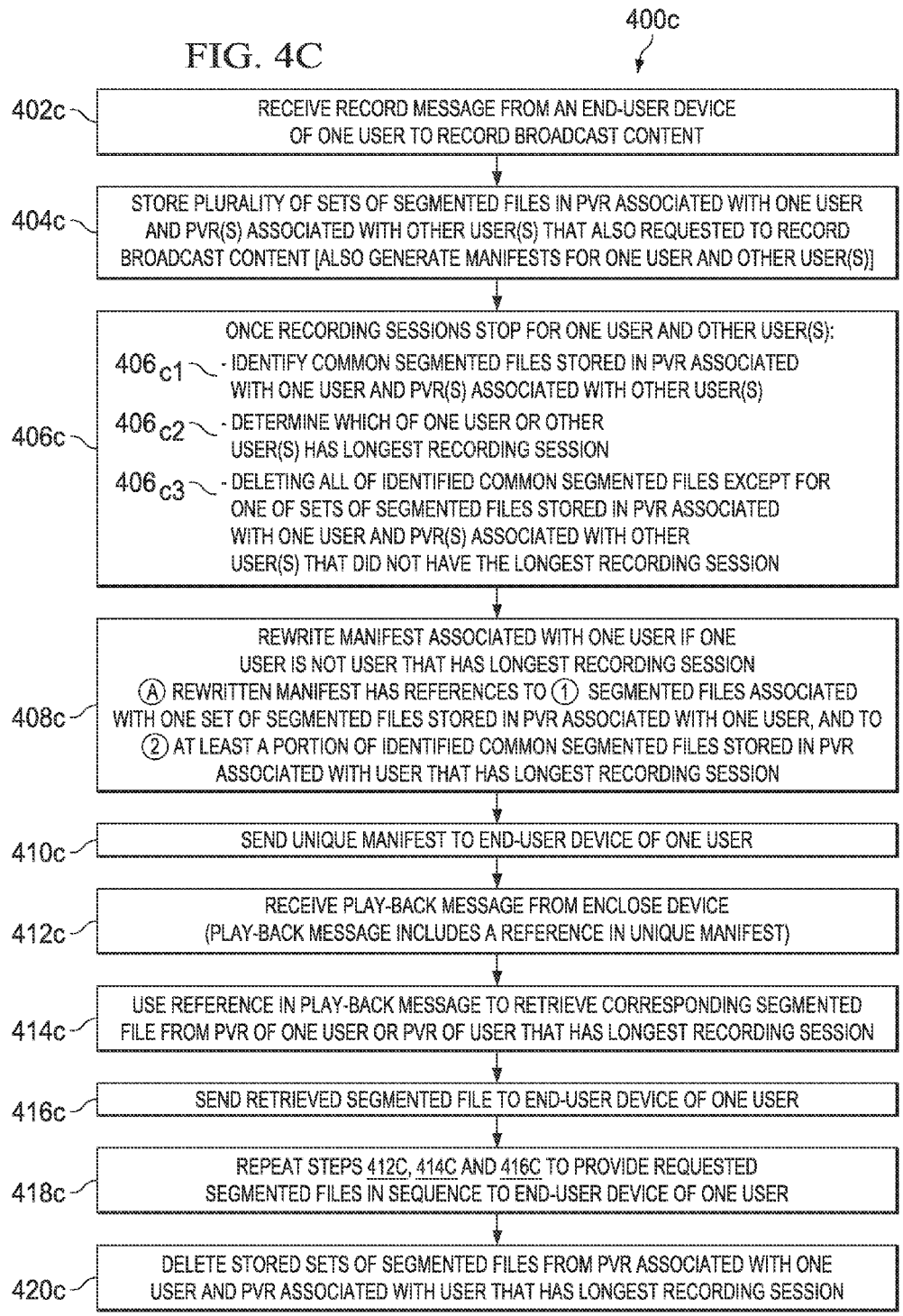

RECORDING DEVICE AND METHOD FOR EFFICIENT NETWORK PERSONAL VIDEO RECORDER MANIPULATION THROUGH ADAPTIVE BIT RATE STREAMING

TECHNICAL FIELD

The present invention relates in general to a network-based personal video recording service and, in particular, to a recording device and a method for providing a network-based personal video recording service utilizing adaptive bit rate technology for a plurality of users.

BACKGROUND

The following abbreviations and terms are herewith defined, at least some of which are referred to within the following description of the state of the art and the present invention.
DVR Digital Video Recorder
Kbs Kilobytes per second
Mbs Megabytes per second
PVR Personal Video Recorder
VCR Video Cassette Recorder Operators today provide a network-based PVR service which allows their customers to record broadcast content in network-based PVRs at will in a similar way that they can record broadcast content by using their non-network-based equivalents such as VCRs, DVRs and regular PVRs. In performing this network-based PVR service, the operators need to follow legal mandates (in the United States and elsewhere) which require that their network-based PVRs store one copy of the recorded content for each user. Such legal mandates can result in inefficiencies especially if the operators happened to utilize adaptive bit rate streaming technology to stream the recorded broadcast content to their users. In this case, the operators would likely keep multiple copies of the same recorded broadcast content each with a different bit rate in everyone of the network-based PVRs associated with each of the users that recorded the broadcast content. This would not be an efficient use of the storage capacity of the network-based PVRs. Hence, there is a need to address this problem and other problems associated with a network-based PVR service which utilizes adaptive bit rate technology to record and stream the recorded broadcast content to customers.

SUMMARY

A recording device and a method for providing a network-based personal video recording service which addresses the aforementioned problem and other problems are described in the independent claims of the present application. Advantageous embodiments of the recording device and method have been described in the dependent claims of the present application.

In one aspect, the present invention includes a recording device for providing a network-based personal video recording service for a plurality of users. The recording device comprises a plurality of PVR storage units, a processor, and a memory, wherein the processor interfaces with the memory and executes the processor-executable instructions stored therein to enable a receiving operation, a storing operation, a generating operation, and a sending operation. In the receiving operation, the recording device receives a record message from an end-user device associated with one user of the plurality of users, wherein the record message contains a request to record a broadcast content. In the storing operation, the recording device stores a plurality of sets of segmented files associated with the broadcast content, wherein each one of the sets of segmented files has a bitrate that is different than bitrates of the remaining sets of the segmented files. In the generating operation, the recording device generates a unique manifest for the one user, wherein the unique manifest has references to segmented files associated with (1) one of the sets of segmented files stored in one of the personal video recorder storage units associated with the one user, and (2) the remaining sets of segmented files stored in a storage unit other than the personal video recorder storage unit associated with the one user. In the sending operation, the recording device sends the unique manifest to the end-user device associated with the one user. The recording device is a marked-improvement over the prior art since the recording device stores one set of the segmented files (single bit rate) of the broadcast content within the PVR storage unit associated with the one user rather than having to store all the sets of the segmented files (multiple bit rates) within the PVR storage unit associated with the one user.

In another aspect, the present invention includes a method implemented by a recording device for providing a network-based personal video recording service for a plurality of users. The method comprises a receiving operation, a storing operation, a generating operation, and a sending operation. In the receiving operation, the recording device receives a record message from an end-user device associated with one user of the plurality of users, wherein the record message contains a request to record a broadcast content. In the storing operation, the recording device stores a plurality of sets of segmented files associated with the broadcast content, wherein each one of the sets of segmented files has a bitrate that is different than bitrates of the remaining sets of the segmented files. In the generating operation, the recording device generates a unique manifest for the one user, wherein the unique manifest has references to segmented files associated with (1) one of the sets of segmented files stored in one of the personal video recorder storage units associated with the one user, and (2) the remaining sets of segmented files stored in a storage unit other than the personal video recorder storage unit associated with the one user. In the sending operation, the recording device sends the unique manifest to the end-user device associated with the one user. The method is a marked-improvement over the prior art since the recording device stores one set of the segmented files (single bit rate) of the broadcast content within the PVR storage unit associated with the one user rather than having to store all the sets of the segmented files (multiple bit rates) within the PVR storage unit associated with the one user.

Additional aspects of the invention will be set forth, in part, in the detailed description, figures and any claims which follow, and in part will be derived from the detailed description, or can be learned by practice of the invention. It is to be understood that both the foregoing general description and the following detailed description are exemplary and explanatory only and are not restrictive of the invention as disclosed.

BRIEF DESCRIPTION OF THE DRAWINGS

A more complete understanding of the present invention may be obtained by reference to the following detailed description when taken in conjunction with the accompanying drawings:

FIGS. 2A-2B are basic diagrams of a recording device configured to provide a network-based personal video recording service for one or more users in accordance with a first embodiment of the present invention;

FIG. 2G1-2G3 is a flowchart illustrating an exemplary method that can be performed by the recording device shown in FIGS. 2A-2B to delete a recorded broadcast content per the method shown in FIG. 2C in accordance with the first embodiment of the present invention;

FIGS. 3A-3B are basic diagrams of a recording device configured to provide a network-based personal video recording service for one or more users in accordance with a second embodiment of the present invention;

FIGS. 4A-4B are basic diagrams of a recording device configured to provide a network-based personal video recording service for multiple users in accordance with a third embodiment of the present invention; and FIG. 4C is a flowchart of a method implemented by the recording device shown in FIGS. 4A-4B to provide a network-based personal video recording service for multiple users in accordance with the third embodiment of the present invention.

DETAILED DESCRIPTION

Figure 1A:
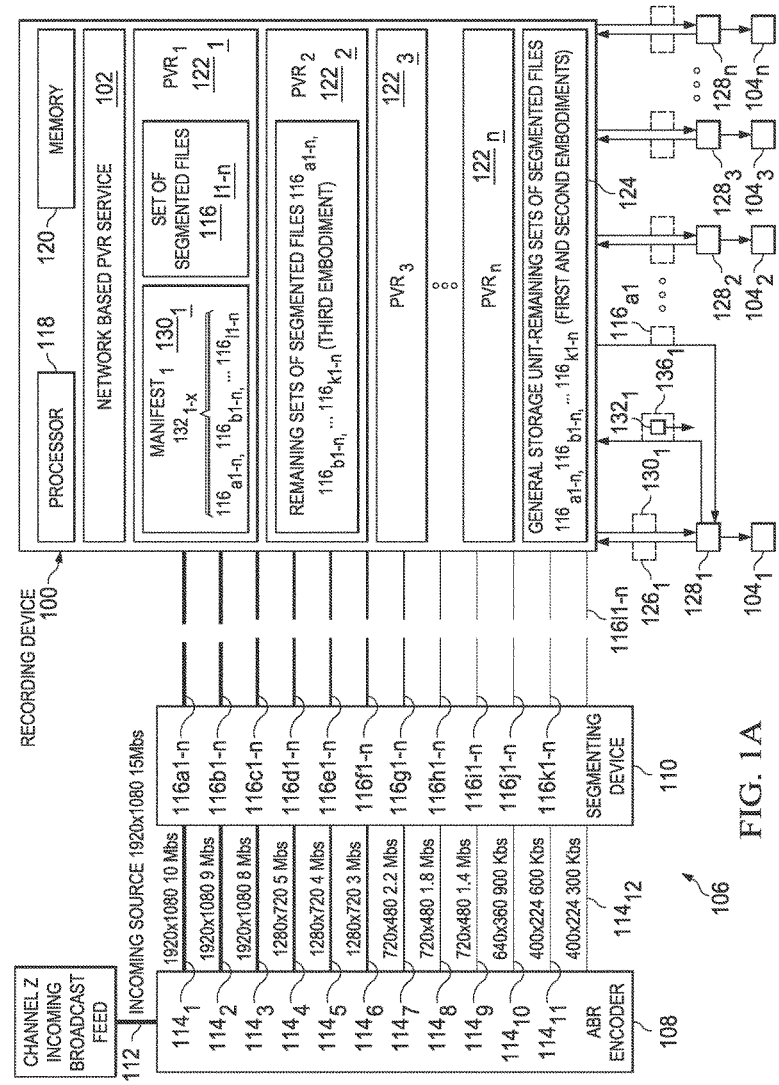
FIG. 1A is a basic diagram of a recording device configured to provide a network-based personal video recording service for one or more users in accordance with an embodiment of the present invention.
Figure 1B:
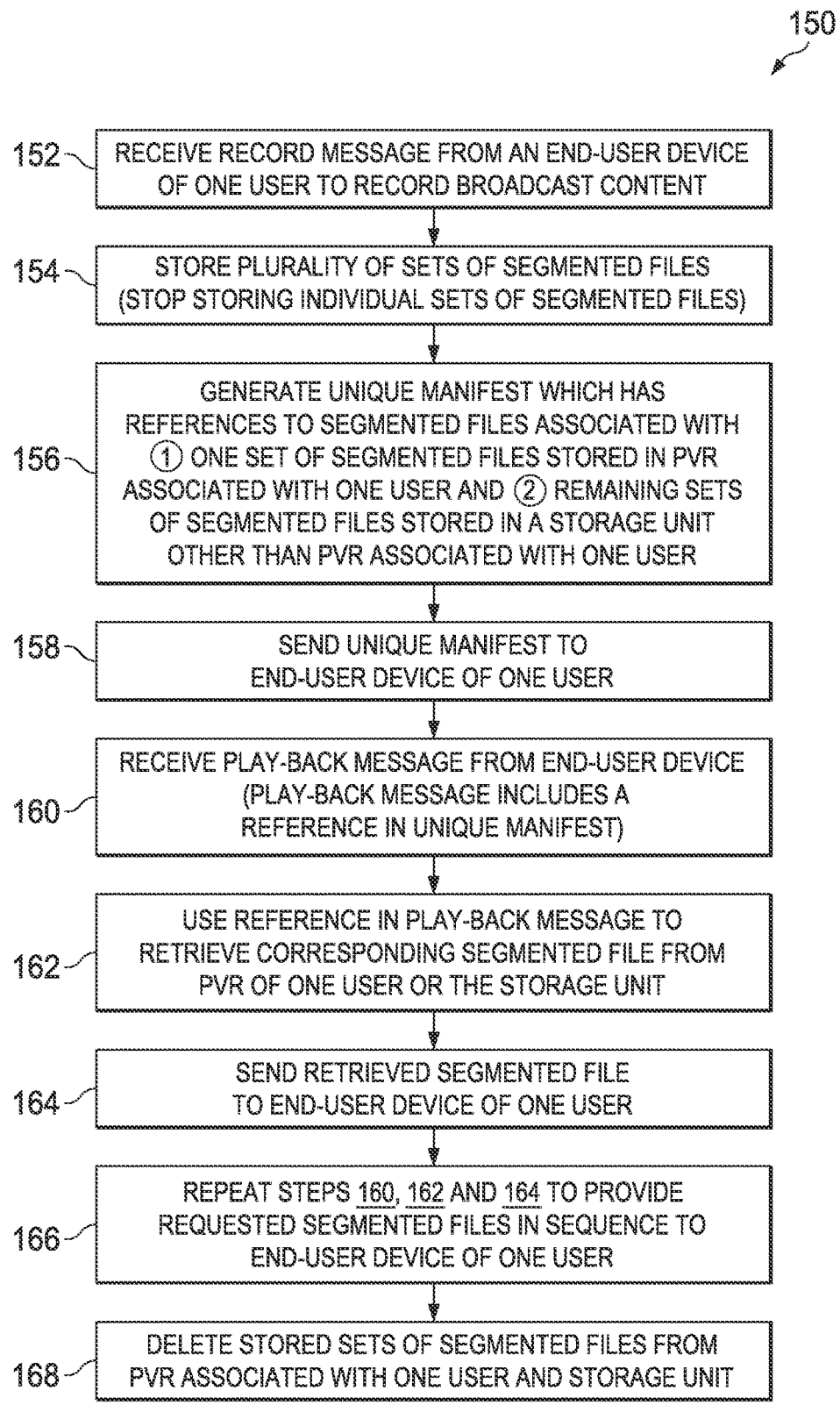
FIG. 1B is a flowchart of a method implemented by the recording device shown in FIG. 1A to provide a network-based personal video recording service for one or more users in accordance with an embodiment of the present invention.

Referring to FIGS. 1A-1B, there are respectively illustrated a basic diagram of a recording device 100 and a flowchart of a method 150 implemented by the recording device 100 to provide a network-based personal video recording service 102 for one or more users $104_1$, $104_2$, $104_3$ . . . $104_n$ in accordance with an embodiment of the present invention. In FIG. 1A, the recording device 100 is shown as being part of a broadcast network 106 (e.g., cable-based content delivery network 106, internet-based content delivery network 106, satellite-based content delivery network 106) that utilizes adaptive bit rate technology to deliver broadcast content to the users $104_1$, $104_2$, $104_3$ . . . $104_n$. The content delivery network 106 includes many well-known components which are used to deliver (stream) different broadcast content (multiple channels) to the users $104_1$, $104_2$, $104_3$ . . . $104_n$ but only two of these known components namely an adaptive bit rate encoder 108 and a segmenting device 110 which are useful in helping to describe the network-based personal video recording service 102 of the present invention are discussed and shown herein.

The adaptive bit rate encoder 108 is configured to receive a broadcast content 112 (e.g., channel Z with a resolution of 1920×1080 at 15 Mbs) and generate multiple files $114_1$, $114_2$, $114_3$, $114_4$, $114_5$, $114_6$, $114_7$, $114_8$, $114_9$, $114_{10}$, $114_{11}$, and $114_{12}$ (for example) of the same video and audio content but which are encoded at different bit rates. In this example, the adaptive bit rate encoder 108 receives the broadcast content 112 (1920×1080 15 Mbs) and outputs a 1920×1080 10 Mbs file $114_1$, a 1920×1080 9 Mbs file $114_2$, a 1920×1080 8 Mbs file $114_3$, a 1280×720 5 Mbs file $114_4$, a 1280×720 4 Mbs file $114_5$, a 1280×720 3 Mbs file $114_6$, a 720×480 2.2 Mbs file $114_7$, a 720×480 1.8 Mbs file $114_8$, a 720×480 1.4 Mbs file $114_9$, a 640×360 900 Kbs file $114_{10}$, a 400×224 600 Kbs file $114_{11}$, and a 400×224 300 Kbs file $114_{12}$. For clarity, only one broadcast content 112 (e.g., channel Z) is shown and described herein.

The segmenting device 110 is configured to receive the files $114_1$, $114_2$, $114_3$, $114_4$, $114_5$, $114_6$, $114_7$, $114_8$, $114_9$, $114_{10}$, $114_{11}$, and $114_{12}$ and then segment each of the files $114_1$, $114_2$, $114_3$, $114_4$, $114_5$, $114_6$, $114_7$, $114_8$, $114_9$, $114_{10}$, $114_{11}$, and $114_{12}$ into multiple segmented files $116_{a1\text{-}n}$, $116_{b1\text{-}n}$, $116_{c1\text{-}n}$, $116_{d1\text{-}n}$, $116_{e1\text{-}n}$, $116_{f1\text{-}n}$, $116_{g1\text{-}n}$, $116_{h1\text{-}n}$, $116_{i1\text{-}n}$, $116_{j1\text{-}n}$, $116_{k1\text{-}n}$, and $116_{l1\text{-}n}$. Each of the segmented files $116_{a1\text{-}n}$, $116_{b1\text{-}n}$, $116_{c1\text{-}n}$, $116_{d1\text{-}n}$, $116_{e1\text{-}n}$, $116_{f1\text{-}n}$, $116_{g1\text{-}n}$, $116_{h1\text{-}n}$, $116_{i1\text{-}n}$, $116_{j1\text{-}n}$, $116_{k1\text{-}n}$ and $116_{l1\text{-}n}$ contains video and audio packets for a predetermined time duration (e.g., 10 seconds). It should be appreciated that the segmented files $116_{a1\text{-}n}$ have a higher quality (higher bit rate) than segmented files $116_{b1\text{-}n}$ which in turn have a higher quality (higher bit rate) than segmented files $116_{c1\text{-}n}$ and so on where the segmented files $116_{l1\text{-}n}$ have the lowest quality (lowest bit rate). The recording device 100 receives the multiple sets of segmented files $116_{a1\text{-}n}$, $116_{b1\text{-}n}$, $116_{c1\text{-}n}$, $116_{d1\text{-}n}$, $116_{e1\text{-}n}$, $116_{f1\text{-}n}$, $116_{g1\text{-}n}$, $116_{h1\text{-}n}$, $116_{i1\text{-}n}$, $116_{j1\text{-}n}$, $116_{k1\text{-}n}$, and $116_{l1\text{-}n}$ from the segmenting device 110. A detailed description is provided next on how the recording device 100 is configured to store these segmented files $116_{a1\text{-}n}$, $116_{b1\text{-}n}$, $116_{c1\text{-}n}$, $116_{d1\text{-}n}$, $116_{e1\text{-}n}$, $116_{f1\text{-}n}$, $116_{g1\text{-}n}$, $116_{h1\text{-}n}$, $116_{i1\text{-}n}$, $116_{j1\text{-}n}$, $116_{k1\text{-}n}$, and $116_{l1\text{-}n}$ in order provide the network-based personal video recording service 102 for the users $104_1$, $104_2$, $104_3$ . . . $104_n$ in accordance with an embodiment of the present invention.

The recording device 100 is shown as having a processor 118, a memory 120, multiple PVR storage units $122_1$, $122_2$, $122_3$ . . . $122_n$ and an optional general storage unit 124. The recording device 100 can have additional well-known components but for clarity only the components needed to explain the present invention are described herein. The recording device 100 is configured such that the processor 118 interfaces with the memory 120 and executes processor-executable instructions stored in the memory 120 to enable the following operations:

1. Receiving a record message $126_1$ from an end-user device $128_1$ (e.g., set-top-box computer, laptop computer, mobile phone (smart phone), tablet, internet capable television) associated with user $104_1$ (for example)(see FIG. 1B's receiving step 152). The record message 126$_1$ contains a request to record the broadcast content 112.

2. Storing multiple sets of segmented files 116$_{a1-n}$, 116$_{b1-n}$, 116$_{c1-n}$, 116$_{d1-n}$, 116$_{e1-n}$, 116$_{f1-n}$, 116$_{g1-n}$, 116$_{h1-n}$, 116$_{i1-n}$, 116$_{j1-n}$, 116$_{k1-n}$, and 116$_{l1-n}$ associated with the broadcast content 112 (see FIG. 1B's storing step 154). The various storage locations in which the segmented files 116$_{a1-n}$, 116$_{b1-n}$, 116$_{c1-n}$, 116$_{d1-n}$, 116$_{e1-n}$, 116$_{f1-n}$, 116$_{g1-n}$, 116$_{h1-n}$, 116$_{i1-n}$, 116$_{j1-n}$, 116$_{k1-n}$, and 116$_{l1-n}$ can be stored are discussed in step 3. In addition, FIGS. 2-4's descriptions explain three exemplary ways and various locations where the segmented files 116$_{a1-n}$, 116$_{b1-n}$, 116$_{c1-n}$, 116$_{d1-n}$, 116$_{e1-n}$, 116$_{f1-n}$, 116$_{g1-n}$, 116$_{h1-n}$, 116$_{i1-n}$, 116$_{j1-n}$, 116$_{k1-n}$, and 116$_{l1-n}$ can be stored to provide the network-based personal video recording service 102 for the users 104$_1$, 104$_2$, 104$_3$ . . . 104$_n$.

3. Generating a unique manifest 130$_1$ (or similar document) for the user 104$_1$ (see FIG. 1B's generating step 156). The unique manifest 130$_1$ has an individual reference 132$_{1-x}$ to each of the segmented files associated with (1) one of the sets of segmented files 116$_{l1-n}$ (for example) which are stored in the PVR storage unit 122$_1$ associated with user 104$_1$, and (2) the remaining sets of segmented files 116$_{a1-n}$, 116$_{b1-n}$, 116$_{c1-n}$, 116$_{d1-n}$, 116$_{e1-n}$, 116$_{f1-n}$, 116$_{g1-n}$, 116$_{h1-n}$, 116$_{i1-n}$, 116$_{j1-n}$, 116$_{k1-n}$ which are stored in a storage unit 122$_2$, 122$_3$ . . . 122$_n$ or 124 other than the PVR storage unit 122$_1$ associated user 104$_1$. As discussed in FIGS. 2-3 (first and second embodiments of present invention), the recording device 100 would store the remaining sets of segmented files 116$_{a1-n}$, 116$_{b1-n}$, 116$_{c1-n}$, 116$_{d1-n}$, 116$_{e1-n}$, 116$_{f1-n}$, 116$_{g1-n}$, 116$_{h1-n}$, 116$_{i1-n}$, 116$_{j1-n}$, 116$_{k1-n}$ in the general storage unit 124. And, as discussed in FIG. 4 (third embodiment of present invention), the recording device 100 would store the remaining sets of segmented files 116$_{a1-n}$, 116$_{b1-n}$, 116$_{c1-n}$, 116$_{d1-n}$, 116$_{e1-n}$, 116$_{f1-n}$, 116$_{g1-n}$, 116$_{h1-n}$, 116$_{i1-n}$, 116$_{j1-n}$, 116$_{k1-n}$ in one of the other PVR storage units 122$_2$ (for example) associated with one of the other users 104$_2$ (for example). In addition, FIGS. 2-4's descriptions explain some exemplary ways the manifest file 130$_1$ and other manifest files 130$_2$, 130$_3$ . . . 130$_n$ can be generated in order to provide the network-based personal video recording service 102 for the users 104$_1$, 104$_2$, 104$_3$ . . . 104$_n$.

4. Sending the unique manifest 130$_1$ to the end-user device 128$_1$ associated with user 104$_1$ (see FIG. 1B's sending step 158).

5. Receiving a play-back message 136 from the end-user device 128$_1$ associated with user 104$_1$ (see FIG. 1B's receiving step 160). The play-back message 136 includes one of the references 132$_1$ (for example) in the unique manifest 130$_1$.

6. Using the one reference 132$_1$ in the play-back message 136 to retrieve a corresponding segmented file 116$_{a1}$ (for example) from the PVR storage unit 122$_1$ associated with user 104$_1$ or from the storage unit 122$_2$, 122$_3$ . . . 122$_n$ and 124 depending on which storage unit 122$_1$, 122$_2$, 122$_3$ . . . 122$_n$ and 124 is actually storing the requested segmented file 116$_{a1}$ (see FIG. 1B's using step 162). In this example, the segmented file 116$_{a1}$ would be retrieved from the general storage unit 124 (for example) rather than from the PVR storage unit 122$_1$ associated with user 104$_1$. This is a marked-improvement over the prior art since the PVR storage unit 122$_1$ no longer has to store all of the segmented files 116$_{a1-n}$, 116$_{b1-n}$, 116$_{c1-n}$, 116$_{d1-n}$, 116$_{e1-n}$, 116$_{f1-n}$, 116$_{g1-n}$, 116$_{h1-n}$, 116$_{i1-n}$, 116$_{j1-n}$, 116$_{k1-n}$.

7. Sending the retrieved segmented file 116$_{a1}$ to the end-user device 128$_1$ associated with user 104$_1$ (see FIG. 1B's sending step 164).

8. Repeating the second receiving operation (step 5), the using operation (step 6), and the second sending operation (7) to provide in a sequential manner the requested segmented files 116$_{b2}$, 116$_{b3}$, 116$_{c4}$, 116$_{k5}$ . . . 116$jn$ (for example) of the recorded broadcast content 112 to the end-user device 128$_1$ associated with user 104$_1$ (see FIG. 1B's repeating step 166).

9. Deleting the (1) one set of segmented files 116$_{l1-n}$ (for example) stored in the specific PVR storage unit 122$_1$ associated with user 104$_1$, and (2) the remaining sets of segmented files 116$_{a1-n}$, 116$_{b1-n}$, 116$_{c1-n}$, 116$_{d1-n}$, 116$_{e1-n}$, 116$_{f1-n}$, 116$_{g1-n}$, 116$_{h1-n}$, 116$_{i1-n}$, 116$_{j1-n}$, 116$_{k1-n}$ which are stored in a storage unit 122$_2$, 122$_3$ . . . 122$_n$ or 124 other than the PVR storage unit 122$_1$ associated with user 104$_1$ after receiving a delete request 139$_1$ from user 104$_1$ (see FIG. 1B's deleting step 168). Exemplary ways that this deleting step could be performed are discussed below in the descriptions associated with FIGS. 2-4.

Note: The description above relates to providing the network-based personal video recording service 102 for one user 104$_1$ but it should be appreciated that the same steps can be performed by the recording device 100 to provide the network-based personal video recording service 102 for any number of users 104$_1$, 104$_2$, 104$_3$ . . . 104$_n$ each of which have their own end-user device 128$_1$, 128$_2$, 128$_3$ . . . 128$_n$ and each of which can record the same broadcast content 112 (e.g., channel Z) or different broadcast content (e.g., channels A-Y) at the same or different times.

It should be appreciated that there a many ways one could configure the recording device 100 so as to provide the network-based personal video recording service 102 for the users 104$_1$, 104$_2$, 104$_3$ . . . 104$_n$ based on the teachings that have described in FIGS. 1A-1B. In this regard, FIGS. 2-4 provide three exemplary ways that the recording device 100 can be configured and operated so as to provide the network-based personal video recording service 102 for the users 104$_1$, 104$_2$, 104$_3$ . . . 104$_n$ in accordance with different embodiments of the present invention.

First Embodiment (FIGS. 2A-2G)

The recording device 100$a$ operates to store a single bit rate (e.g., segmented files 116$_{l1-n}$—most likely the ones which have the lowest bit rate) of the broadcast content 112 into each individual network PVR storage unit 122$_1$, 122$_2$, 122$_3$ . . . 122$_n$ per the requests in the record messages 126$_1$, 126$_2$, 126$_3$ . . . 126$_n$ of the users 104$_1$, 104$_2$, 104$_3$ . . . 104$_n$. At the same time, the recording device 100$a$ operates such that as long as one user 104$_1$ (for example) has initiated a recording of the broadcast content 112 to record all other bitrates (segmented files 116$_{a1-n}$, 116$_{b1-n}$, 116$_{c1-n}$, 116$_{d1-n}$, 116$_{e1-n}$, 116$_{f1-n}$, 116$_{g1-n}$, 116$_{h1-n}$, 116$_{i1-n}$, 116$_{j1-n}$, 116$_{k1-n}$) of the broadcast content 112 within the general storage unit 124. The recording device 100$a$ also generates and stores the individual user's unique manifests 130$_1$, 130$_2$, 130$_3$ . . . 130$_n$ within the individual user's network PVR storage units 122$_1$, 122$_2$, 122$_3$ . . . 122$_n$. For instance, the network PVR storage unit 122$_1$ would store manifest 130$_1$ for user 104$_1$, while the network PVR storage unit 122$_2$ would store manifest 130$_2$ for user 104$_2$ and so on. The manifests 130$_1$, 130$_2$, 130$_3$ . . . 130$_n$ are specific to the corresponding users 104$_1$, 104$_2$, 104$_3$ . . . 104$_n$, where each manifest 130$_1$, 130$_2$, 130$_3$ . . . 130$_n$ references the respective user's personal bit rate (segmented files 116$_{l1-n}$), as well as the general bitrates (segmented files 116$_{a1-n}$, 116$_{b1-n}$, 116$_{c1-n}$, 116$_{d1-n}$, 116$_{e1-n}$, 116$_{f1-n}$, 116$_{g1-n}$, 116$_{h1-n}$, 116$_{i1-n}$, 116$_{j1-n}$, 116$_{k1-n}$) whose time codes are synchronized to the corresponding personal bit rate. This time code synchronization of the general bit rates is done so the users $104_1, 104_2, 104_3 \ldots 104_n$ cannot watch general broadcast content 112 which they do not also have a local copy recorded in their respective network PVR storage unit $122_1, 122_2, 122_3 \ldots 122_n$. Should no users $104_1, 104_2, 104_3 \ldots 104_n$ be currently recording the broadcast content 112, then the recording device 100a does not record anything in the general storage unit 124. Should a user $104_1$ (for example) delete their recording, then the recording device 100a would delete that user's personal manifest $130_1$ and their single bit rate (segmented files $116_{l1-n}$) stored in their network PVR storage unit $122_1$. Additionally, the recording device 100a checks to see if that user $104_1$ has permission for recorded segments in the general storage unit 124 that no other user $104_2, 104_3 \ldots 104_n$ can access. If so, the recording device 100 deletes those segments as well (since no one will be able to view them anymore). An advantage of the first embodiment is that it allows both user initiated recording and prescheduled recording to be handled by the recording device 100a.

Figure 3A:
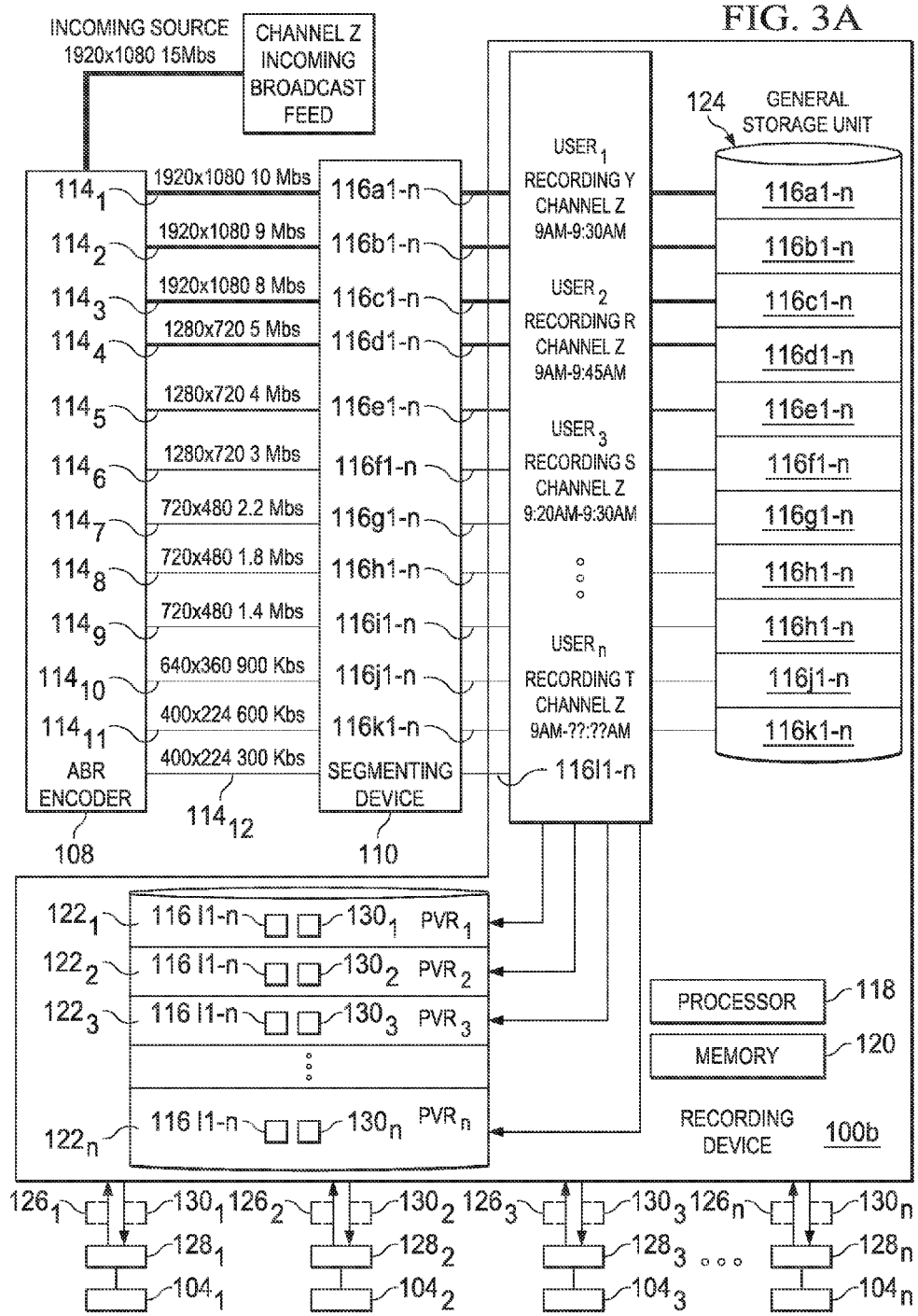
Figure 3C:
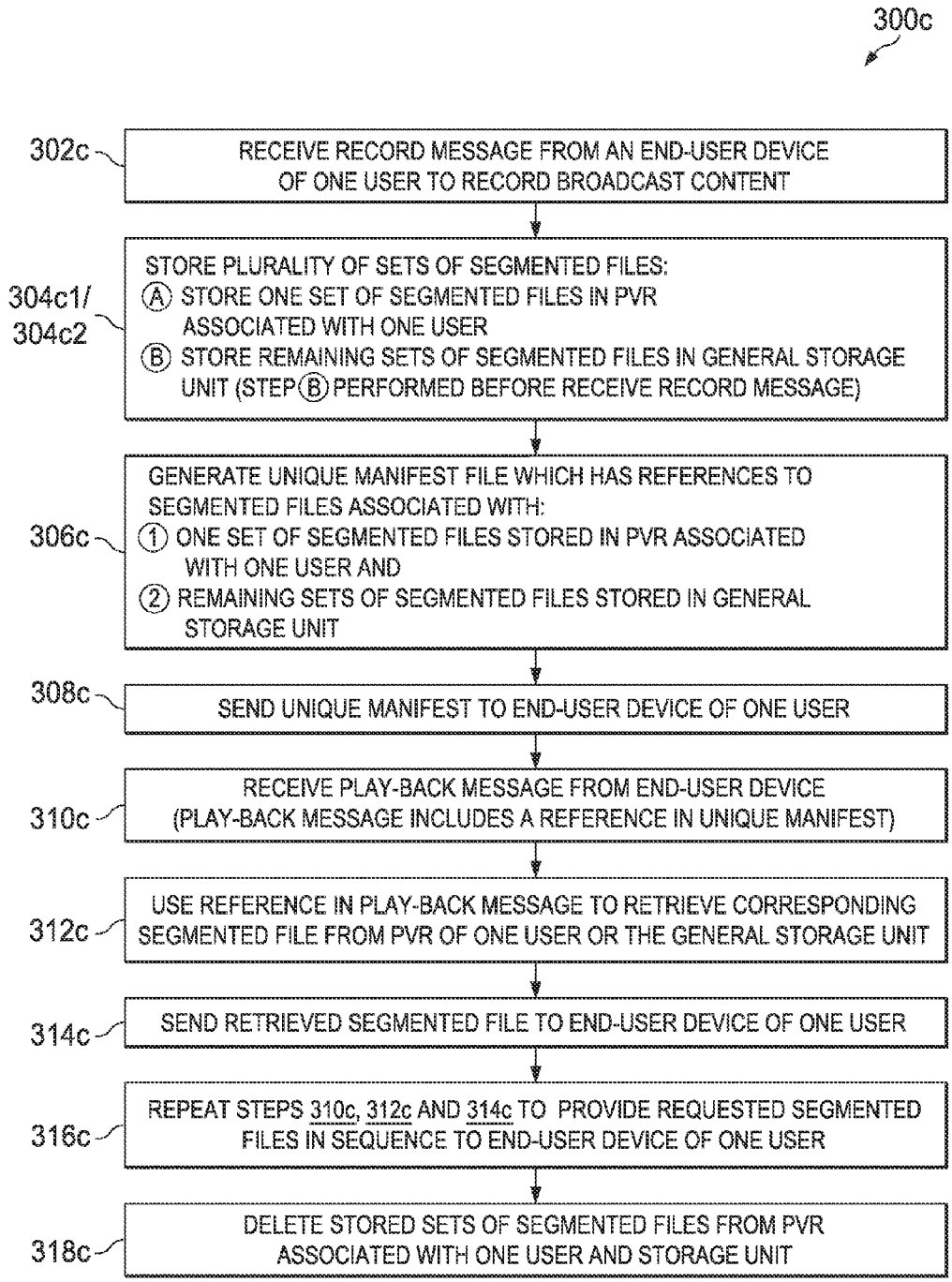
FIG. 3C is a flowchart of a method implemented by the recording device shown in FIGS. 3A-3B to provide a network-based personal video recording service for one or more users in accordance with the second embodiment of the present invention.

Second Embodiment (FIGS. 3A-3C)

The second embodiment is the same as the first embodiment except that the recording device 100b is always capturing and storing general bitrates (segmented files $116_{a1-n}, 116_{b1-n}, 116_{c1-n}, 116_{d1-n}, 116_{e1-n}, 116_{f1-n}, 116_{g1-n}, 116_{h1-n}, 116_{i1-n}, 116_{j1-n}, 116_{k1-n}$) of the broadcast content 112 in the general storage unit 124 regardless of whether or not any of the users $104_1, 104_2, 104_3 \ldots 104_n$ have requested to record the broadcast content 112. Basically, the recording device 100b is configured to record the broadcast content 112 at a single bit rate (most likely lowest bit rate available) for each user $104_1, 104_2, 104_3 \ldots 104_n$ who wishes to record it within their respective network PVR storage unit $122_1, 122_2, 122_3 \ldots 122_n$. And, prior to this time, the recording system 100b has been recording the remaining bitrates if not all of the bitrates of the broadcast content 112 in the general storage unit 124. Thus, when a user $104_1$ (for example) attempts to stream their recorded broadcast content 112, the recording device 100b sends the user $104_1$ their unique manifest $130_1$ (or similar document) which contains references $132_{1-x}$ to all of the segmented files (bit rates) of the recorded broadcast content 112. The user $104_1$ can then use their unique manifest $130_1$ to access either their personally stored single bit rate (segmented files $116_{l1-n}$) or the generally stored bit rates (segmented files $116_{a1-n}, 116_{b1-n}, 116_{c1-n}, 116_{d1-n}, 116_{e1-n}, 116_{f1-n}, 116_{g1-n}, 116_{h1-n}, 116_{i1-n}, 116_{j1-n}, 116_{k1-n}$).

Third Embodiment (FIGS. 4A-4C)

The recording device 100c can record all bitrates (segmented files $116_{a1-n}, 116_{b1-n}, 116_{c1-n}, 116_{d1-n}, 116_{e1-n}, 116_{f1-n}, 116_{g1-n}, 116_{h1-n}, 116_{i1-n}, 116_{j1-n}, 116_{k1-n}, 116_{l1-n}$) for each user $104_1, 104_2, 104_3 \ldots 104_n$ in their respective network PVR storage unit $122_1, 122_2, 122_3 \ldots 122_n$. When a specific user $104_1$ (for example) indicates that they would like to stop recording, then the recording device 100 ends their personal recording. After all users $104_1, 104_2, 104_3 \ldots 104_n$ have finished recording, then the recording device 100c determines which user $104_2$ (for example) has the "most complete" recording, and deletes everyone else's "extra" bitrates (leaving at least a single bit rate) in their respective network PVR storage unit $122_1, 122_3, \ldots 122_n$. Then, when a user $104_1$ (for example) wants to play the recorded broadcast content 112, that user $104_1$ is provided a manifest $130_1$ with references to the "most complete" recording of the broadcast content 112 within the network PVR storage unit $122_2$ of user $104_2$ (for example) and the one bit rate (e.g., segmented files $116_{l1-n}$) within the network PVR storage unit $122_1$ of user $104_1$. As can be appreciated, the user $104_2$ (for example) which in has the "most" complete recording will be provided a "normal" manifest $130_2$ while the remaining users $104_1, 104_3 \ldots 104_n$ will be respectively provided "unique" manifests $130_1, 130_3 \ldots 130_n$ which reference a patchwork of network PVR storage units $122_1, 122_2, 122_3 \ldots 122_n$. Should that recording be deleted by user $104_2$, the recording device 100 nevertheless will save that recording so long as any other user $104_1, 104_3 \ldots 104_n$ has a single bit rate recording left for it in their network PVR storage units $122_1, 122_3 \ldots 122_n$.

Referring to FIGS. 2A-2B, there are respectively illustrated a basic diagram of a recording device 100a and a flowchart of a method 200c implemented by the recording device 100a to provide the network-based personal video recording service 102 for one or more users $104_1, 104_2, 104_3 \ldots 104_n$ in accordance with the first embodiment of the present invention. In FIG. 2A, the recording device 100a is shown as being a part of a broadcast network 106 (e.g., cable-based content delivery network 106, internet-based content delivery network 106, satellite-based content delivery network 106) that utilizes adaptive bit rate technology to deliver broadcast content (multiple channels) to the users $104_1, 104_2, 104_3 \ldots 104_n$. The content delivery network 106 includes many well-known components which are used to deliver (stream) broadcast content (multiple channels) to the users $104_1, 104_2, 104_3 \ldots 104_n$ but only two of these known components namely an adaptive bit rate encoder 108 and a segmenting device 110 which are useful in helping to describe the network-based personal video recording service 102 are discussed and shown herein.

The adaptive bit rate encoder 108 is configured to receive the broadcast content 112 (e.g., channel Z with a resolution of 1920×1080 at 15 Mbs) and generate multiple files $114_1, 114_2, 114_3, 114_4, 114_5, 114_6, 114_7, 114_8, 114_9, 114_{10}, 114_{11}$, and $114_{12}$ (for example) of the same video and audio content but which are encoded at different bit rates. In this example, the adaptive bit rate encoder 404 receives the broadcast content 112 (1920×1080 15 Mbs) and outputs a 1920×1080 10 Mbs file $114_1$, a 1920×1080 9 Mbs file $114_2$, a 1920×1080 8 Mbs file $114_3$, a 1280×720 5 Mbs file $114_4$, a 1280×720 4 Mbs file $114_5$, a 1280×720 3 Mbs file $114_6$, a 720×480 2.2 Mbs file $114_7$, a 720×480 1.8 Mbs file $114_8$, a 720×480 1.4 Mbs file $114_9$, a 640×360 900 Kbs file $114_{10}$, a 400×224 600 Kbs file $114_{11}$, and a 400×224 300 Kbs file $114_{12}$.

The segmenting device 110 is configured to receive the files $114_1, 114_2, 114_3, 114_4, 114_5, 114_6, 114_7, 114_8, 114_9, 114_{10}, 114_{11}$, and $114_{12}$ and then segment each of the files $114_1, 114_2, 114_3, 114_4, 114_5, 114_6, 114_7, 114_8, 114_9, 114_{10}, 114_{11}$, and $114_{12}$ into multiple segmented files $116_{a1-n}, 116_{b1-n}, 116_{c1-n}, 116_{d1-n}, 116_{e1-n}, 116_{f1-n}, 116_{g1-n}, 116_{h1-n}, 116_{i1-n}, 116_{j1-n}, 116_{k1-n}$, and $116_{l1-n}$. Each of the segmented files $116_{a1-n}, 116_{b1-n}, 116_{c1-n}, 116_{d1-n}, 116_{e1-n}, 116_{f1-n}, 116_{g1-n}, 116_{h1-n}, 116_{i1-n}, 116_{j1-n}, 116_{k1-n}$, and $116_{l1-n}$ contains video and audio packets for a predetermined time duration (e.g., 10 seconds). It should be appreciated that the segmented files $116_{a1-n}$ have a higher quality (higher bit rate) than segmented files $116_{b1-n}$ which in turn have a higher quality (higher bit rate) than segmented files $116_{c1-n}$ and so on where the segmented files $116_{l1-n}$ have the lowest quality (lowest bit rate). The recording device 100a receives the multiple sets of segmented files $116_{a1-n}, 116_{b1-n}, 116_{c1-n}, 116_{d1-n}, 116_{e1-n}, 116_{f1-n}, 116_{g1-n}, 116_{h1-n}, 116_{i1-n}, 116_{j1-n}$, $116_{k1-n}$, and $116_{l1-n}$ from the segmenting device 110. A detailed description is provided next on how the recording device 100a is configured to store these segmented files $116_{a1-n}$, $116_{b1-n}$, $116_{c1-n}$, $116_{d1-n}$, $116_{e1-n}$, $116_{f1-n}$, $116_{g1-n}$, $116_{h1-n}$, $116_{i1-n}$, $116_{j1-n}$, $116_{k1-n}$, and $116_{l1-n}$ to provide the network-based personal video recording service 102 for the users $104_1$, $104_2$, $104_3$ . . . $104_n$ in accordance with the first embodiment of the present invention.

The recording device 100a is shown as having a processor 118, a memory 120, multiple PVR storage units $122_1$, $122_2$, $122_3$ . . . $122_n$ and the general storage unit 124. The recording device 100a can have additional well-known components but for clarity only the components needed to explain the present invention are described herein. The recording device 100a is configured such that the processor 118 interfaces with the memory 120 and executes processor-executable instructions stored in the memory 120 to enable the following operations:

1. Receiving a record message $126_1$ from an end-user device $128_1$ (e.g., set-top-box computer, laptop computer, mobile phone (smart phone), tablet, internet capable television) associated with user $104_1$ (for example)(see FIG. 2C's receiving step 202c). In practice, the recording device 100a would receive record messages $126_1$, $126_2$, $126_3$ . . . $126_n$ from the end-user devices $128_1$, $128_2$, $128_3$ . . . $128_n$ (e.g., set-top-box computers, laptop computers, mobile phones (smart phones), tablets, internet capable televisions) respectively associated with users $104_1$, $104_2$, $104_3$ . . . $104_n$. In this example, the record message $126_1$ contains a request to record the broadcast content 112 from 9:00 AM-9:30 AM for user $104_1$. The record message $126_2$ contains a request to record the broadcast content 112 from 9:00 AM-9:45 AM. The record message $126_3$ contains a request to record the broadcast content 112 from 9:20 AM-9:30 AM. And, the record message $126_n$ contains a request to record the broadcast content 112 from 9:08 AM-?? . . . ??, where the user $104_n$ selected the record button on channel Z (broadcast content 112) at 9:08 AM and ?? . . . ?? is when the user $104_n$ selects the stop button. In one embodiment, the recording device 100a can receive a "prescheduled" record message $126_1$ from user $104_1$ (or any other user $104_2$, $104_3$ . . . $104_n$) where the "prescheduled" record message $126_1$ contains a request to record the broadcast content 112 in the future by indicating a particular start time and a particular end time.

2. Storing one of the sets of segmented files $116_{l1-n}$ (e.g., the lowest bit rate) in the network PVR storage unit $122_1$ associated with user $104_1$ (see FIG. 2C's receiving step 204c1). In this example, the segmented files $116_{l1-n}$ are stored in the network PVR storage unit $122_1$ associated with user $104_1$ from 9:00 AM-9:30 AM. In addition, the recording device 100a would store the remaining sets of segmented files $116_{a1-n}$, $116_{b1-n}$, $116_{c1-n}$, $116_{d1-n}$, $116_{e1-n}$, $116_{f1-n}$, $116_{g1-n}$, $116_{h1-n}$, $116_{i1-n}$, $116_{j1-n}$, $116_{k1-n}$ of the broadcast content 112 in the general storage unit 124 if they are not already being stored therein (see FIG. 2Cs storing step 204c2). In this example, the recording device 100a begins to store the remaining sets of segmented files $116_{a1-n}$, $116_{b1-n}$, $116_{c1-n}$, $116_{d1-n}$, $116_{e1-n}$, $116_{f1-n}$, $116_{g1-n}$, $116_{h1-n}$, $116_{i1-n}$, $116_{j1-n}$, $116_{k1-n}$ of the broadcast content 112 in the general storage unit 124 at 9:00 AM. Plus, the recording device 100a stores the segmented files $116_{l1-n}$ in the network PVR storage unit $122_2$ associated with user $104_2$ from 9:00 AM-9:45 AM. In addition, the recording device 100a stores the segmented files $116_{l1-n}$ in the network PVR storage unit $122_3$ associated with user $104_3$ from 9:20 AM-9:30 AM. The recording device 100a also stores the segmented files $116_{l1-n}$ in the network PVR storage unit $122_n$ associated with user $104_n$ from 9:08 AM-?? . . . ??. Once, user $104_n$ stops the recording of the broadcast content 112 assuming it is after 9:45 AM then the recording device 100a stops storing the segmented files $116_{l1-n}$ in the network PVR storage unit $122_n$ associated with user $104_n$ and stops storing the remaining sets of segmented files $116_{a1-n}$, $116_{b1-n}$, $116_{c1-n}$, $116_{d1-n}$, $116_{e1-n}$, $116_{f1-n}$, $116_{g1-n}$, $116_{h1-n}$, $116_{i1-n}$, $116_{j1-n}$, $116_{k1-n}$ in the general storage unit 124.

3. Generating a unique manifest $130_1$ for the user $104_1$ (see FIG. 2C's generating step 206c). The unique manifest $130_1$ has individual references $132_{1-x}$ to each of the segmented files associated with (1) one of the sets of segmented files $116_{l1-n}$ (for example) which are stored in the specific PVR storage unit $122_1$ associated with user $104_1$, and (2) the remaining sets of segmented files $116_{a1-n}$, $116_{b1-n}$, $116_{c1-n}$, $116_{d1-n}$, $116_{e1-n}$, $116_{f1-n}$, $116_{g1-n}$, $116_{h1-n}$, $116_{i1-n}$, $116_{j1-n}$, $116_{k1-n}$ which are stored in the general storage unit 124. In this example, the recording device 100a also generates a unique manifest $130_2$ for user $104_2$, where the unique manifest $130_2$ has individual references $132_{1-x}$ to each of the segmented files associated with (1) one of the sets of segmented files $116_{l1-n}$ (for example) which are stored in the network PVR storage unit $122_2$ associated with user $104_2$, and (2) the remaining sets of segmented files $116_{a1-n}$, $116_{b1-n}$, $116_{c1-n}$, $116_{d1-n}$, $116_{e1-n}$, $116_{f1-n}$, $116_{g1-n}$, $116_{h1-n}$, $116_{i1-n}$, $116_{j1-n}$, $116_{k1-n}$ which are stored in the general storage unit 124. In addition, the recording device 100a generates a unique manifest $130_3$ for user $104_3$, where the unique manifest $130_3$ has individual references $132_{1-x}$ to each of the segmented files associated with (1) one of the sets of segmented files $116_{l1-n}$ (for example) which are stored in the network PVR storage unit $122_3$ associated with user $104_3$, and (2) the remaining sets of segmented files $116_{a1-n}$, $116_{b1-n}$, $116_{c1-n}$, $116_{d1-n}$, $116_{e1-n}$, $116_{f1-n}$, $116_{g1-n}$, $116_{h1-n}$, $116_{i1-n}$, $116_{j1-n}$, $116_{k1-n}$ which are stored in the general storage unit 124. The recording device 100a also generates a unique manifest $130_n$ for user $104_n$, where the unique manifest $130_n$ has individual references $132_{1-x}$ to each of the segmented files associated with (1) one of the sets of segmented files $116_{l1-n}$ (for example) which are stored in the network PVR storage unit $122_n$ associated with user $104_n$, and (2) the remaining sets of segmented files $116_{a1-n}$, $116_{b1-n}$, $116_{c1-n}$, $116_{d1-n}$, $116_{e1-n}$, $116_{f1-n}$, $116_{g1-n}$, $116_{h1-n}$, $116_{i1-n}$, $116_{j1-n}$, $116_{k1-n}$ which are stored in the general storage unit 124. The unique manifests $130_1$, $130_2$, $130_3$ . . . $130_n$ each have individual references $132_{1-x}$ to each of the segmented files $116_{a1-n}$, $116_{b1-n}$, $116_{c1-n}$, $116_{d1-n}$, $116_{e1-n}$, $116_{f1-n}$, $116_{g1-n}$, $116_{h1-n}$, $116_{i1-n}$, $116_{k1-n}$, and $116_{l1-n}$ associated with the broadcast content 112 for time periods of 9:00 AM-9:30 AM for user $104_1$, 9:00 AM-9:45 AM for user $104_2$, 9:20 AM-9:30 AM for user $104_3$, and 9:08 AM-?? . . . ?? for user $104_n$, respectively.

Figure 2C:
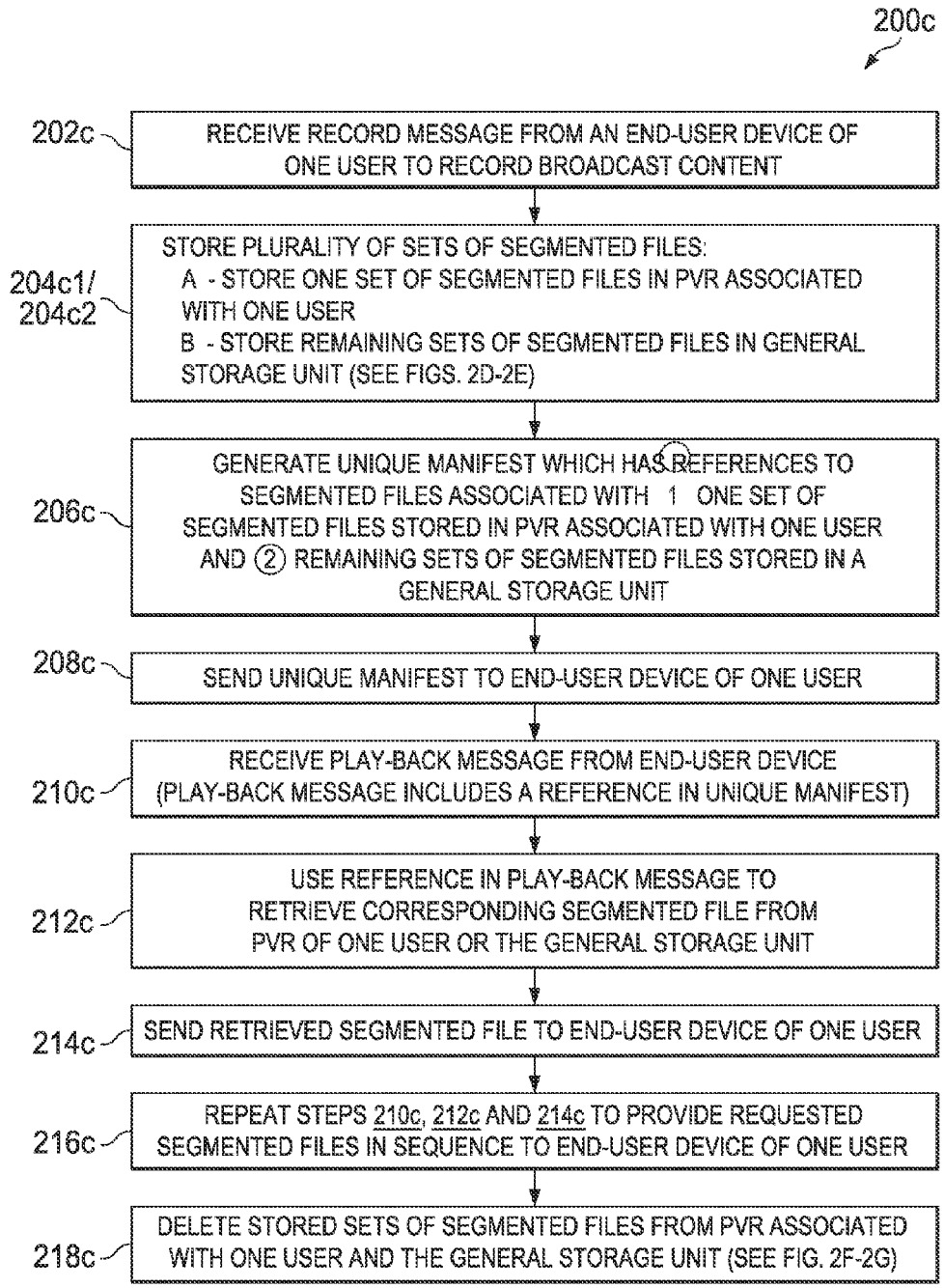
FIG. 2C is a flowchart of a method implemented by the recording device shown in FIGS. 2A-2B to provide a network-based personal video recording service for one or more users in accordance with the first embodiment of the present invention.

4. Sending the unique manifest $130_1$ to the end-user device $128_1$ associated with user $104_1$ (see FIG. 2C's sending step 208c). In this example, the recording device 100a also sends unique manifests $130_2$, $130_3$ . . . $130_n$ to the end-user devices $128_2$, $128_3$ . . . $128_n$ associated with users $104_2$, $104_3$ . . . $104_n$ (note: the unique manifest $130_n$ would be sent to user $104_n$ upon the completion of the recording process which is when user $104_n$ stops the recording). FIG. 2A graphically illustrates steps 1-4 while FIG. 2B graphically illustrates the following steps 5-8.

5. Receiving a play-back message $136_1$ from the end-user device $128_1$ associated with user $104_1$ (see FIG. 2C's receiving step 210c). The play-back message $136_1$ includes one of the references $132_1$ (for example) in the unique manifest $130_1$. FIG. 2B illustrates the recording device 100a receiving the play-back message $136_1$ from the end-user device $128_1$ associated with user $104_1$. For clarity, the recording device $100a$ shown in FIG. 2B does not illustrate the recording device $100a$ receiving play-back messages $136_2$, $136_3$ ... $136_n$ from end-user devices $128_2$, $128_3$ ... $128_n$ associated with users $104_2$, $104_3$ ... $104_n$. In addition, FIG. 2B does not illustrate the recording device $100a$ interacting with and streaming the requested segmented files of the recorded broadcast content 112 to the end-user devices $128_2$, $128_3$ ... $128_n$ associated with users $104_2$, $104_3$ ... $104_n$. However, it should be appreciated that the recording device $100a$ interacts with and streams the requested segmented files of the recorded broadcast content 112 to the end-user devices $128_2$, $128_3$ ... $128_n$ associated with users $104_2$, $104_3$ ... $104_n$ in the same manner as it does with user $104_1$.

6. Using the one reference $132_1$ in the play-back message $136_1$ to retrieve a corresponding segmented file $116_{a1}$ (for example) from either the PVR storage unit $122_1$ associated with user $104_1$ or from the general storage unit 124 depending on which storage unit $122_1$ or 124 is actually storing the requested segmented file $116_{a1}$ (see FIG. 2C's using step $212c$). In this example, the recording device $100a$ would retrieve the segmented file $116_{a1}$ from the general storage unit 124 since it is not stored in the PVR storage unit $122_1$ associated with user $104_1$. This is a marked-improvement over the prior art since the PVR storage unit $122_1$ no longer has to store all of the segmented files $116_{a1-n}$, $116_{b1-n}$, $116_{c1-n}$, $116_{d1-n}$, $116_{e1-n}$, $116_{f1-n}$, $116_{g1-n}$, $116_{h1-n}$, $116_{i1-n}$, $116_{j1-n}$, $116_{k1-n}$.

7. Sending the retrieved segmented file $116_{a1}$ to the end-user device $128_1$ associated with user $104_1$ (see FIG. 2C's sending step $214c$).

8. Repeating the second receiving operation (step 5) by receiving play-back messages $136_2$, $136_3$, $136_4$ ... $136_n$ with references $132_2$, $132_3$, $132_4$ ... $132_n$, the using operation (step 6) to retrieve segmented files $116_{b2}$, $116_{b3}$, $116_{c4}$ ... $116_{jn}$ (for example), and the second sending operation (step 7) by sending the retrieved segmented files $116_{b2}$, $116_{b3}$, $116_{c4}$ ... $116_{jn}$ of the broadcast content 112 in a sequential manner to the end-user device $128_1$ associated with user $104_1$ (see FIG. 2C's repeating step $216c$).

9. Deleting the (1) one set of segmented files $116_{j1-n}$ (for example) stored in the specific PVR storage unit $122_1$ associated with user $104_1$, and (2) the remaining sets of segmented files $116_{a1-n}$, $116_{b1-n}$, $116_{c1-n}$, $116_{d1-n}$, $116_{e1-n}$, $116_{f1-n}$, $116_{g1-n}$, $116_{h1-n}$, $116_{i1-n}$, $116_{j1-n}$, $116_{k1-n}$ which are stored in the general storage unit 124 after receiving a delete request $139_n$ from user $104_1$ (see FIG. 2C's deleting step $218c$).

Note: The description above with respect to steps 5-9 relates to providing the network-based personal video recording service 102 for one user $104_1$ but it should be appreciated that the same steps can be performed by the recording device $100a$ to provide the network-based personal video recording service 102 for any number of users $104_1$, $104_2$, $104_3$ ... $104_n$ each of which have their own end-user device $128_1$, $128_2$, $128_3$ ... $128_n$ and each of which can record the same broadcast content 112 (e.g., channel Z) or different broadcast content (e.g., channels A-Y) at the same time or different times.

Figure 2D:
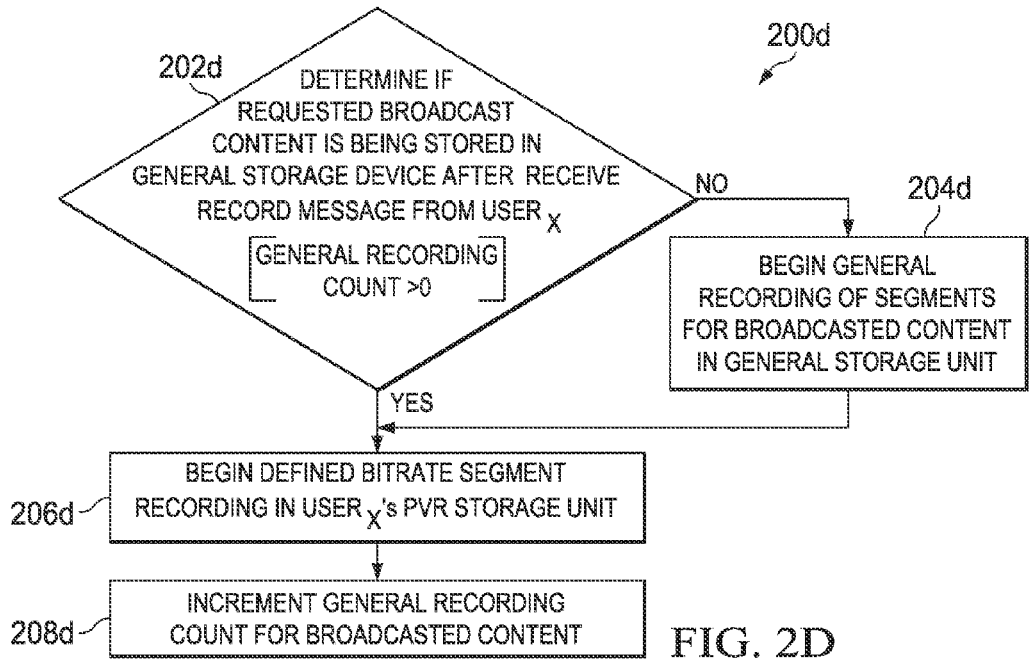
FIG. 2D is a flowchart illustrating an exemplary method that can be performed by the recording device shown in FIGS. 2A-2B to start a storing process of the method shown in FIG. 2C in accordance with the first embodiment of the present invention.

Referring to FIG. 2D, there is shown a basic flowchart illustrating an exemplary method $200d$ that can be performed by the recording device $100a$ to start the storing process in accordance with the first embodiment of the present invention (see the aforementioned step 3 and FIG. 2C's storing step $204c$). In the beginning step $202d$, the recording device $100a$ upon receiving a record message $126_x$ (which can be anyone of record messages $126_1$, $126_2$, $126_3$ ... $126_n$) from user $104_x$ (which can be anyone of users $104_1$, $104_2$, $104_3$ ... $104_n$) determines if the broadcast content 112 is currently being stored in the general storage unit 124 (e.g., determine if general recording count >0 for broadcast content 112 which if yes means more than one other user $104_1$, $104_2$, $104_3$ ... $104_n$ is already recording the broadcast content 112). If the result of the determining step $202d$ is no, beginning at step $204d$ to store the remaining sets of segmented files $116_{a1-n}$, $116_{b1-n}$, $116_{c1-n}$, $116_{d1-n}$, $116_{e1-n}$, $116_{f1-n}$, $116_{g1-n}$, $116_{h1-n}$, $116_{i1-n}$, $116_{j1-n}$, $116_{k1-N}$ of the broadcast content 112 in the general storage unit 124. After step $204d$ or if a result of the determining step $202d$ is yes, beginning at step $206d$ to store the one set of segmented files $116_{j1-n}$ in the network PVR $122_x$ associated with user $104_x$. After the beginning step $206d$, incrementing at step $208d$ the general recording count for the broadcast content 112 to indicate the actual number of users $104_1$, $104_2$, $104_3$ ... $104_n$ who are currently recording the broadcast content 112. At the end of step $208d$, the recording device $100a$ would begin generating the unique manifest $130_x$ for user $104_x$ as discussed about in step 4 and FIG. 2C's step $206c$.

Figure 2E:
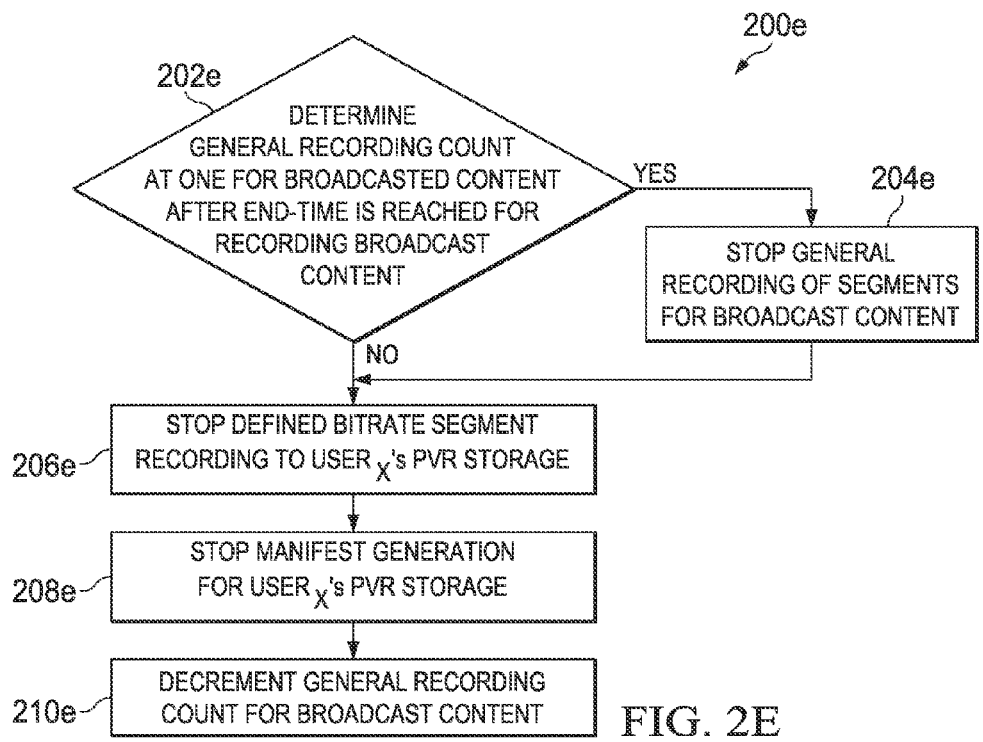
FIG. 2E is a flowchart illustrating an exemplary method that can be performed by the recording device shown in FIGS. 2A-2B to stop the storing process of the method shown in FIG. 2C in accordance with the first embodiment of the present invention.

Referring to FIG. 2E, there is shown a basic flowchart illustrating an exemplary method $200e$ that can be performed by the recording device $100a$ to stop the storing process in accordance with the first embodiment of the present invention (see the aforementioned step 3 and FIG. 2C's storing step $204c$). In the beginning step $202e$, the recording device $100a$ after an end time has been reached for recording the broadcast content 112 for a user $104_x$ (which can be anyone of users $104_1$, $104_2$, $104_3$ ... $104_n$) determines if a general recording count is at one indicating that user $104_x$ is the only user that was recording the broadcast content 112. If the result of the determining step $202e$ is yes, the recording device $100a$ at step $204e$ stops the storing of the remaining sets of segmented files files $116_{a1-n}$, $116_{b1-n}$, $116_{c1-n}$, $116_{d1-n}$, $116_{e1-n}$, $116_{f1-n}$, $116_{g1-n}$, $116_{h1-n}$, $116_{i1-n}$, $116_{j1-n}$, $116_{k1-n}$ in the general storage unit 124. After the stopping step $204e$ or if the result of the determining step $202e$ is no, the recording device $100a$ at step $206e$ stops the storing of the one set of segmented files $116_{j1-n}$ in the network PVR storage unit $122_x$ of user $104_x$. After the stopping step $206e$, the recording device $100a$ at step $208e$ stops the generation of the unique manifest $130_x$ for user $104_x$, and then the recording device $100a$ at step $210e$ decrements the general recording count by one for the broadcast content 112. If desired, the recording device $100a$ can perform step $210e$ before performing step $208e$.

Figure 2F:
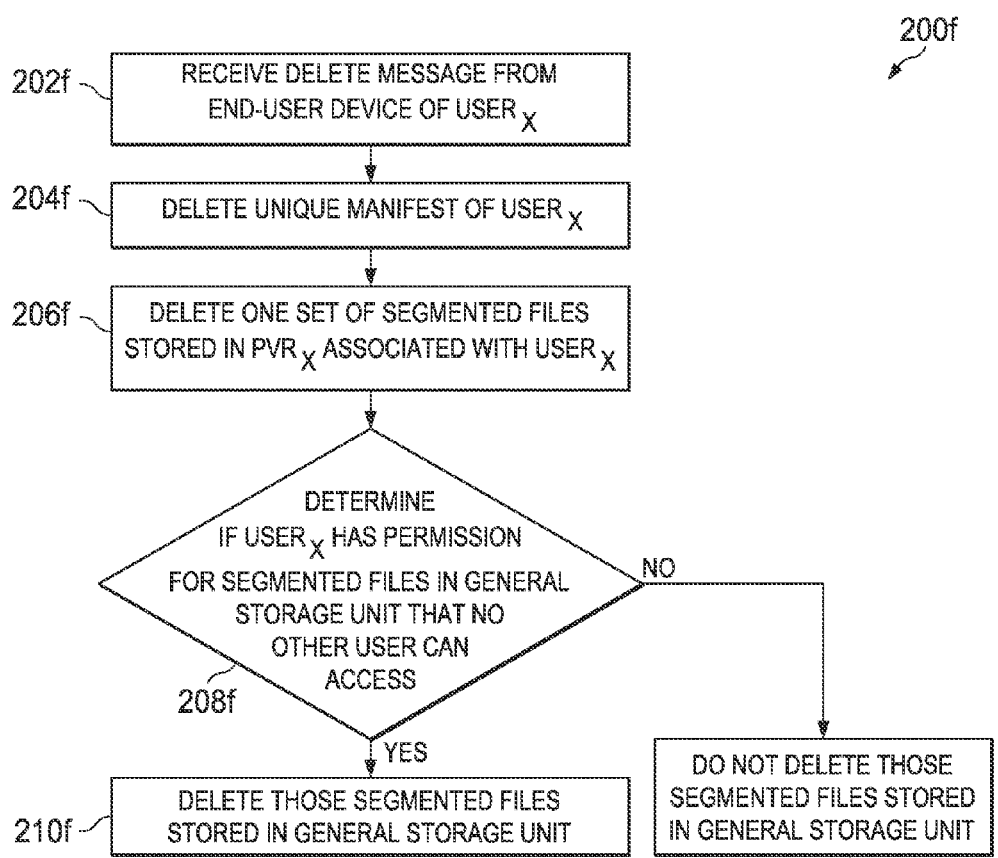
FIG. 2F is a flowchart illustrating an exemplary method that can be performed by the recording device shown in FIGS. 2A-2B to delete a recorded broadcast content per the method shown in FIG. 2C in accordance with the first embodiment of the present invention.

Referring to FIG. 2F, there is shown a basic flowchart illustrating an exemplary method $200f$ that can be performed by the recording device $100a$ to delete a recorded broadcast content 112 in accordance with the first embodiment of the present invention (see the aforementioned step 9 and FIG. 2C's deleting step $218c$). At step $202f$, the recording device $100a$ receives a delete request $139_x$ from user $104_x$ (which can be anyone of users $104_1$, $104_2$, $104_3$ ... $104_n$). The delete message $139_x$ contains a request to delete the recorded broadcast content 112 associated with user $104_x$. At step $204f$, the recording device $100a$ deletes the unique manifest $130_x$ of user $104_x$. At step $206f$, the recording device $100a$ deletes the segmented files $116_{j1-n}$ associated with the recorded broadcast content 112 stored in the network PVR $122_x$ associated with user $104_x$. At step $208f$, the recording device $100a$ determines if user $104_x$ has permission for segmented files associated with the recorded broadcast content 122 stored in the general storage unit 124 that none of the remaining users can access. If the result of the determining step 208f is yes, then the recording device 100a at step 210f deletes those stored segmented files in the general storage unit 124 that none of the remaining users can access. If the result of the determining step 208f is no, then the recording device 100a at step 212f does not delete those stored segmented files in the general storage unit 124 that none of the remaining users can access.

Referring to FIG. 2G1-2G3, there is shown a basic flowchart illustrating an exemplary method 200g that can be performed by the recording device 100a to delete a recorded broadcast content 112 in accordance with the first embodiment of the present invention (see the aforementioned step 9 and FIG. 2C's deleting step 218c). In the beginning at step 202g, the recording device 100a receives a delete request $139_x$ from user user $104_x$ (which can be anyone of users $104_1$, $104_2$, $104_3$ ... $104_n$). The delete message $139_x$ contains a request to delete the recorded broadcast content 112 associated with user $104_x$. At step 204g, the recording device 100a retrieves the recorded broadcast content 112's start and end times. At step 206g, the recording device 100a generates a list of all general recorded segmented files for user $104_x$'s recording start and end times in the general storage unit 124. At step 208g, the recording device 100a generates a list of a all recordings from all users $104_1$, $104_2$, $104_3$ ... $104_n$ (not including user $104_x$) that include an overlap time between user $104_x$'s start and end times for the recorded broadcast content 112. At step 210g, the recording device 100a determines if the overlapping user's recordings list is empty. If the result of step 210g is no, then the recording device 100a at steps 212g, 214g and 216g respectively retrieves the first overlapping user's recording from all user's overlapping recording lists, retrieves the first segment in user 104x's list of general recorded segments, and retrieves the first segment from overlapping user's (not user $104_x$) general recorded segments. Then, the recording device 100a at step 218g determines if user $104_x$'s segment is same as overlapping user's segment. If the result of step 218g is yes, then the recording device 100a at step 220g removes the segment file from user $104_x$'s list of general recorded segments. After step 220g or if the result of step 218g is no, the recording device 100a at step 222g determines if at end of user's (non user $104_x$) overlapping segments. If the result of step 222g is no, then the recording device 100a at step 224g determines if list of general recorded segments for user $104_x$ is empty. If the result of step 224g is no, then the recording device 100a at step 226g retrieves the next segment from the general user's (non user $104_x$) recorded broadcast content 112 and then proceeds back to step 218g. If the result of step 224g is yes, then the recording device 100a at step 228g deletes user $104_x$'s local segments and manifest $130_x$ for the recorded broadcast content 112 between start and end. Then, the recording device 100a at step 230g deletes the recorded broadcast content 112 from the list of other recorded broadcast content. If the result of step 222g is yes, then the recording device 100a at step 232g determines if at end of overlapping user's recording list. If the result of step 232g is no, then the recording device 100a at step 234g gets next overlapping user's recording from all user's overlapping recording lists and then proceeds back to step 214g. If the result of step 232g is yes or the result of step 210g is yes, then the recording device 100a at step 236g retrieves the first segment in user $104_x$'s list of general recorded segments. Then, the recording device 100a at step 238g deletes the segment file from general recorded segments. Thereafter, the recording device 100a at step 240g determines if at end of user $104_x$'s list of general recorded segments. If the result of step 240g is no, the recording device 100a at step 242g retrieves the next segment file from general recorded segments and proceeds to step 238g. If the result of step 240g is yes, then the recording device 100a proceeds to step 228g.

Referring to FIGS. 3A-3C, there are respectively illustrated a basic diagram of a recording device 100b and a flowchart of a method 300 implemented by the recording device 100b to provide the network-based personal video recording service 102 for one or more users $104_1$, $104_2$, $104_3$ ... $104_n$ in accordance with the second embodiment of the present invention. In FIG. 3A, the recording device 100b is shown as being a part of a broadcast network 106 (e.g., cable-based content delivery network 106, internet-based content delivery network 106, satellite-based content delivery network 106) that utilizes adaptive bit rate technology to deliver broadcast content (multiple channels) to the users $104_1$, $104_2$, $104_3$ ... $104_n$. The content delivery network 106 includes many well-known components which are used to deliver (stream) broadcast content (multiple channels) to the users $104_1$, $104_2$, $104_3$ ... $104_n$ but only two of these known components namely an adaptive bit rate encoder 108 and a segmenting device 110 which are useful in helping to describe the network-based personal video recording service 102 are discussed and shown herein.

The adaptive bit rate encoder 108 is configured to receive the broadcast content 112 (e.g., channel Z with a resolution of 1920×1080 at 15 Mbs) and generate multiple files $114_1$, $114_2$, $114_3$, $114_4$, $114_5$, $114_6$, $114_7$, $114_8$, $114_9$, $114_{10}$, $114_{11}$, and $114_{12}$ (for example) of the same video and audio content but which are encoded at different bit rates. In this example, the adaptive bit rate encoder 404 receives the broadcast content 112 (1920×1080 15 Mbs) and outputs a 1920×1080 10 Mbs file $114_1$, a 1920×1080 9 Mbs file $114_2$, a 1920×1080 8 Mbs file $114_3$, a 1280×720 5 Mbs file $114_4$, a 1280×720 4 Mbs file $114_5$, a 1280×720 3 Mbs file $114_6$, a 720×480 2.2 Mbs file $114_7$, a 720×480 1.8 Mbs file $114_8$, a 720×480 1.4 Mbs file $114_9$, a 640×360 900 Kbs file $114_{10}$, a 400×224 600 Kbs file $114_{11}$, and a 400×224 300 Kbs file $114_{12}$.

The segmenting device 110 is configured to receive the files $114_1$, $114_2$, $114_3$, $114_4$, $114_5$, $114_6$, $114_7$, $114_8$, $114_9$, $114_{10}$, $114_{11}$, and $114_{12}$ and then segment each of the files $114_1$, $114_2$, $114_3$, $114_4$, $114_5$, $114_6$, $114_7$, $114_8$, $114_9$, $114_{10}$, $114_{11}$, and $114_{12}$ into multiple segmented files $116_{a1-n}$, $116_{b1-n}$, $116_{c1-n}$, $116_{d1-n}$, $116_{e1-n}$, $116_{f1-n}$, $116_{g1-n}$, $116_{h1-n}$, $116_{i1-n}$, $116_{j1-n}$, $116_{k1-n}$, and $116_{l1-n}$. Each of the segmented files $116_{a1-n}$, $116_{b1-n}$, $116_{c1-n}$, $116_{d1-n}$, $116_{e1-n}$, $116_{f1-n}$, $116_{g1-n}$, $116_{h1-n}$, $116_{i1-n}$, $116_{j1-n}$, $116_{k1-n}$, and $116_{l1-n}$ contains video and audio packets for a predetermined time duration (e.g., 10 seconds). It should be appreciated that the segmented files $116_{a1-n}$ have a higher quality (higher bit rate) than segmented files $116_{b1-n}$ which in turn have a higher quality (higher bit rate) than segmented files $116_{c1-n}$ and so on where the segmented files $116_{l1-n}$ have the lowest quality (lowest bit rate). The recording device 100b receives the multiple sets of segmented files $116_{a1-n}$, $116_{b1-n}$, $116_{c1-n}$, $116_{d1-n}$, $116_{e1-n}$, $116_{f1-n}$, $116_{g1-n}$, $116_{h1-n}$, $116_{i1-n}$, $116_{j1-n}$, $116_{k1-n}$, and $116_{l1-n}$ from the segmenting device 110. A detailed description is provided next on how the recording device 100b is configured to store these segmented files $116_{a1-n}$, $116_{b1-n}$, $116_{c1-n}$, $116_{d1-n}$, $116_{e1-n}$, $116_{f1-n}$, $116_{g1-n}$, $116_{h1-n}$, $116_{i1-n}$, $116_{j1-n}$, $116_{k1-n}$, and $116_{l1-n}$ to provide the network-based personal video recording service 102 for the users $104_1$, $104_2$, $104_3$ ... $104_n$ in accordance with the second embodiment of the present invention.

The recording device 100b is shown as having a processor 118, a memory 120, multiple PVR storage units $122_1$, $122_2$, $122_3$ ... $122_n$ and the general storage unit 124. The recording device 100b can have additional well-known components but for clarity only the components needed to explain the present invention are described herein. The recording device 100b is configured such that the processor 118 interfaces with the memory 120 and executes processor-executable instructions stored in the memory 120 to enable the following operations:

1. Receiving a record message 126₁ from an end-user device 128₁ (e.g., set-top-box computer, laptop computer, mobile phone (smart phone), tablet, internet capable television) associated with user 104₁ (for example)(see FIG. 3C's receiving step 302c). In practice, the recording device 100b would receive record messages 126₁, 126₂, 126₃ . . . 126ₙ from the end-user devices 128₁, 128₂, 128₃ . . . 128ₙ (e.g., set-top-box computers, laptop computers, mobile phones (smart phones), tablets, internet capable televisions) respectively associated with users 104₁, 104₂, 104₃ . . . 104ₙ. In this example, the record message 126₁ contains a request to record the broadcast content 112 from 9:00 AM-9:30 AM for user 104₁. The record message 126₂ contains a request to record the broadcast content 112 from 9:00 AM-9:45 AM. The record message 126₃ contains a request to record the broadcast content 112 from 9:20 AM-9:30 AM. And, the record message 126ₙ contains a request to record the broadcast content 112 from 9:08 AM-?? . . . ??, where the user 104ₙ selected the record button on channel Z (broadcast content 112) at 9:08 AM and ?? . . . ?? is when the user 104ₙ selects the stop button. In one embodiment, the recording device 100b can receive a "prescheduled" record message 126₁ from user 104₁ (or any other user 104₂, 104₃ . . . 104ₙ) where the "prescheduled" record message 126₁ contains a request to record the broadcast content 112 in the future by indicating a particular start time and a particular end time.

2. Storing one of the sets of segmented files 116ⱼ₁₋ₙ (e.g., the lowest bit rate) in the network PVR storage unit 122₁ associated with user 104₁ (see FIG. 3C's receiving step 304c1). In this example, the segmented files 116ⱼ₁₋ₙ are stored in the network PVR storage unit 122₁ associated with user 104₁ from 9:00 AM-9:30 AM. In addition, the recording device 100b would have already been storing the remaining sets of segmented files 116ₐ₁₋ₙ, 116ᵦ₁₋ₙ, 116c₁₋ₙ, 116d₁₋ₙ, 116ₑ₁₋ₙ, 116f₁₋ₙ, 116g₁₋ₙ, 116h₁₋ₙ, 116ᵢ₁₋ₙ, 116ⱼ₁₋ₙ, 116k₁₋ₙ (or all of the sets of segmented files) of the broadcast content 112 in the general storage unit 124 (see FIG. 3Cs storing step 304c2). In particular, the recording device 100b always stores the remaining sets of segmented files 116ₐ₁₋ₙ, 116ᵦ₁₋ₙ, 116c₁₋ₙ, 116d₁₋ₙ, 116ₑ₁₋ₙ, 116f₁₋ₙ, 116g₁₋ₙ, 116h₁₋ₙ, 116ᵢ₁₋ₙ, 116ⱼ₁₋ₙ, 116k₁₋ₙ of the broadcast content 112 in the general storage unit 124 regardless of whether or not a record message 126ₓ (anyone of the record messages 126₁, 126₂, 126₃ . . . 126ₙ) is received from an end-user device 128ₓ (anyone of the end-user devices 128₁, 128₂, 128₃ . . . 128ₙ) of a user 104ₓ (anyone of the users 104₁, 104₂, 104₃ . . . 104ₙ). In this example, the recording device 100b would have been storing the remaining sets of segmented files 116ₐ₁₋ₙ, 116ᵦ₁₋ₙ, 116c₁₋ₙ, 116d₁₋ₙ, 116ₑ₁₋ₙ, 116f₁₋ₙ, 116g₁₋ₙ, 116h₁₋ₙ, 116ᵢ₁₋ₙ, 116ⱼ₁₋ₙ, 116k₁₋ₙ, (or all of the sets of segmented files) of the broadcast content 112 in the general storage unit 124 prior to 9:00 AM. Plus, the recording device 100b would store the segmented files 116ⱼ₁₋ₙ in the network PVR storage unit 122₂ associated with user 104₂ from 9:00 AM-9:45 AM. In addition, the recording device 100b stores the segmented files 116ⱼ₁₋ₙ in the network PVR storage unit 122₃ associated with user 104₃ from 9:20 AM-9:30 AM. The recording device 100b also stores the segmented files 116ⱼ₁₋ₙ in the network PVR storage unit 122ₙ associated with user 104ₙ from 9:08 AM-?? . . . ??. Once, user 104ₙ stops the recording of the broadcast content 112 assuming it is after 9:45 AM then the recording device 100b stops storing the segmented files 116ⱼ₁₋ₙ in the network PVR storage unit 122ₙ associated with user 104ₙ but would continue storing the remaining sets of segmented files 116ₐ₁₋ₙ, 116ᵦ₁₋ₙ, 116c₁₋ₙ, 116d₁₋ₙ, 116ₑ₁₋ₙ, 116f₁₋ₙ, 116g₁₋ₙ, 116h₁₋ₙ, 116ᵢ₁₋ₙ, 116ⱼ₁₋ₙ, 116k₁₋ₙ (or all of the sets of segmented files) in the general storage unit 124.

3. Generating a unique manifest 130₁ for the user 104₁ (see FIG. 3C's generating step 306c). The unique manifest 130₁ has individual references 132₁₋ₓ to each of the segmented files associated with (1) one of the sets of segmented files 116ⱼ₁₋ₙ (for example) which are stored in the specific PVR storage unit 122₁ associated with user 104₁, and (2) the remaining sets of segmented files 116ₐ₁₋ₙ, 116ᵦ₁₋ₙ, 116c₁₋ₙ, 116d₁₋ₙ, 116ₑ₁₋ₙ, 116f₁₋ₙ, 116g₁₋ₙ, 116h₁₋ₙ, 116ᵢ₁₋ₙ, 116ⱼ₁₋ₙ, 116k₁₋ₙ which are stored in the general storage unit 124. In this example, the recording device 100b also generates a unique manifest 130₂ for user 104₂, where the unique manifest 130₂ has individual references 132₁₋ₓ to each of the segmented files associated with (1) one of the sets of segmented files 116ⱼ₁₋ₙ (for example) which are stored in the network PVR storage unit 122₂ associated with user 104₂, and (2) the remaining sets of segmented files 116ₐ₁₋ₙ, 116ᵦ₁₋ₙ, 116c₁₋ₙ, 116d₁₋ₙ, 116ₑ₁₋ₙ, 116f₁₋ₙ, 116g₁₋ₙ, 116h₁₋ₙ, 116ᵢ₁₋ₙ, 116ⱼ₁₋ₙ, 116k₁₋ₙ which are stored in the general storage unit 124. In addition, the recording device 100b generates a unique manifest 130₃ for user 104₃, where the unique manifest 130₃ has individual references 132₁₋ₓ to each of the segmented files associated with (1) one of the sets of segmented files 116ⱼ₁₋ₙ (for example) which are stored in the network PVR storage unit 122₃ associated with user 104₃, and (2) the remaining sets of segmented files 116ₐ₁₋ₙ, 116ᵦ₁₋ₙ, 116c₁₋ₙ, 116d₁₋ₙ, 116ₑ₁₋ₙ, 116f₁₋ₙ, 116g₁₋ₙ, 116h₁₋ₙ, 116ᵢ₁₋ₙ, 116ⱼ₁₋ₙ, 116k₁₋ₙ which are stored in the general storage unit 124. The recording device 100b also generates a unique manifest 130ₙ for user 104ₙ where the unique manifest 130ₙ has individual references 132₁₋ₓ to each of the segmented files associated with (1) one of the sets of segmented files 116ⱼ₁₋ₙ (for example) which are stored in the network PVR storage unit 122ₙ associated with user 104ₙ, and (2) the remaining sets of segmented files 116ₐ₁₋ₙ, 116ᵦ₁₋ₙ, 116c₁₋ₙ, 116d₁₋ₙ, 116ₑ₁₋ₙ, 116f₁₋ₙ, 116g₁₋ₙ, 116h₁₋ₙ, 116ᵢ₁₋ₙ, 116ⱼ₁₋ₙ, 116k₁₋ₙ which are stored in the general storage unit 124. The unique manifests 130₁, 130₂, 130₃ . . . 130ₙ each have individual references 132₁₋ₓ to each of the segmented files 116ₐ₁₋ₙ, 116ᵦ₁₋ₙ, 116c₁₋ₙ, 116d₁₋ₙ, 116ₑ₁₋ₙ, 116f₁₋ₙ, 116g₁₋ₙ, 116h₁₋ₙ, 116ᵢ₁₋ₙ, 116ⱼ₁₋ₙ, 116k₁₋ₙ and 116ⱼ₁₋ₙ associated with the broadcast content 112 for time periods of 9:00 AM-9:30 AM for user 104₁, 9:00 AM-9:45 AM for user 104₂, 9:20 AM-9:30 AM for user 104₃, and 9:08 AM-?? . . . ?? for user 104ₙ, respectively.

4. Sending the unique manifest 130₁ to the end-user device 128₁ associated with user 104₁ (see FIG. 3C's sending step 308c). In this example, the recording device 100b also sends unique manifests 130₂, 130₃ . . . 130ₙ to the end-user devices 128₂, 128₃ . . . 128ₙ associated with users 104₂, 104₃ . . . 104ₙ (note: the unique manifest 130ₙ would be sent to user 104ₙ upon the completion of the recording process which is when user 104ₙ stops the recording). FIG. 3A graphically illustrates steps 1-4 while FIG. 3B graphically illustrates the following steps 5-8.

5. Receiving a play-back message 136₁ from the end-user device 128₁ associated with user 104₁ (see FIG. 3C's receiving step 310c). The play-back message 136₁ includes one of the references 132₁ (for example) in the unique manifest 130₁. FIG. 3B illustrates the recording device 100b receiving the play-back message 136₁ from the end-user device $128_1$ associated with user $104_1$. For clarity, the recording device $100a$ shown in FIG. 3B does not illustrate the recording device $100a$ receiving play-back messages $136_2$, $136_3 \ldots 136_n$ from end-user devices $128_2$, $128_3 \ldots 128_n$ associated with users $104_2$, $104_3 \ldots 104_n$. In addition, FIG. 3B does not illustrate the recording device $100a$ interacting with and streaming the requested segmented files of the recorded broadcast content 112 to the end-user devices $128_2$, $128_3 \ldots 128_n$ associated with users $104_2$, $104_3 \ldots 104_n$. However, it should be appreciated that the recording device $100a$ interacts with and streams the requested segmented files of the recorded broadcast content 112 to the end-user devices $128_2$, $128_3 \ldots 128_n$ associated with users $104_2$, $104_3 \ldots 104_n$ in the same manner as it does with user $104_1$.

6. Using the one reference $132_1$ in the play-back message $136_1$ to retrieve a corresponding segmented file $116_{a1}$ (for example) from either the PVR storage unit $122_1$ associated with user $104_1$ or from the general storage unit 124 depending on which storage unit $122_1$ or 124 is actually storing the requested segmented file $116_{a1}$ (see FIG. 3C's using step $312c$). In this example, the recording device $100b$ would retrieve the segmented file $116_{a1}$ from the general storage unit 124 since it is not stored in the PVR storage unit $122_1$ associated with user $104_1$. This is a marked-improvement over the prior art since the PVR storage unit $122_1$ no longer has to store all of the segmented files $116_{a1-n}$, $116_{b1-n}$, $116_{c1-n}$, $116_{d1-n}$, $116_{e1-n}$, $116_{f1-n}$, $116_{g1-n}$, $116_{h1-n}$, $116_{i1-n}$, $116_{j1-n}$, $116_{k1-n}$.

7. Sending the retrieved segmented file $116_{a1}$ to the end-user device $128_1$ associated with user $104_1$ (see FIG. 3C's sending step $314c$).

8. Repeating the second receiving operation (step 5) by receiving play-back messages $136_2$, $136_3$, $136_4 \ldots 136_n$ with references $132_2$, $132_3$, $132_4 \ldots 132_n$ the using operation (step 6) to retrieve segmented files $116_{b2}$, $116_{b3}$, $116_{c4} \ldots 116_{jn}$ (for example), and the second sending operation (step 7) by sending the retrieved segmented files $116b_2$, $116_{b3}$, $116_{c4} \ldots 116j_n$ of the broadcast content 112 in a sequential manner to the end-user device $128_1$ associated with user $104_1$ (see FIG. 3C's repeating step $316c$).

9. Deleting the (1) one set of segmented files $116_{j1-n}$ (for example) stored in the specific PVR storage unit $122_1$ associated with user $104_1$, and (2) the remaining sets of segmented files $116_{a1-n}$, $116_{b1-n}$, $116_{c1-n}$, $116_{d1-n}$, $116_{e1-n}$, $116_{f1-n}$, $116_{g1-n}$, $116_{h1-n}$, $116_{i1-n}$, $116_{j1-n}$, $116_{k1-n}$ which are stored in the general storage unit 124 after receiving a delete request $139_1$ from user $104_1$ (see FIG. 3C's deleting step $318c$).

Note: The description above relates to providing the network-based personal video recording service 102 for one user $104_1$ but it should be appreciated that the same steps can be performed by the recording device $100b$ to provide the network-based personal video recording service 102 for any number of users $104_1$, $104_2$, $104_3 \ldots 104_n$ each of which have their own end-user device $128_1$, $128_2$, $128_3 \ldots 128_n$ and each of which can record the same broadcast content 112 (e.g., channel Z) or different broadcast content (e.g., channels A-Y) at the same time or different times.

Referring to FIGS. 4A-4C, there are respectively illustrated a basic diagram of a recording device $100c$ and a flowchart of a method 400 implemented by the recording device $100c$ to provide the network-based personal video recording service 102 for one or more users $104_1$, $104_2$, $104_3 \ldots 104_n$ in accordance with the third embodiment of the present invention. In FIG. 4A, the recording device $100c$ is shown as being a part of a broadcast network 106 (e.g., cable-based content delivery network 106, internet-based content delivery network 106, satellite-based content delivery network 106) that utilizes adaptive bit rate technology to deliver broadcast content (multiple channels) to the users $104_1$, $104_2$, $104_3 \ldots 104_n$. The content delivery network 106 includes many well-known components which are used to deliver (stream) broadcast content (multiple channels) to the users $104_1$, $104_2$, $104_3 \ldots 104_n$ but only two of these known components namely an adaptive bit rate encoder 108 and a segmenting device 110 which are useful in helping to describe the network-based personal video recording service 102 are discussed and shown herein.

The adaptive bit rate encoder 108 is configured to receive the broadcast content 112 (e.g., channel Z with a resolution of 1920×1080 at 15 Mbs) and generate multiple files $114_1$, $114_2$, $114_3$, $114_4$, $114_5$, $114_6$, $114_7$, $114_8$, $114_9$, $114_{10}$, $114_{11}$, and $114_{12}$ (for example) of the same video and audio content but which are encoded at different bit rates. In this example, the adaptive bit rate encoder 404 receives the broadcast content 112 (1920×1080 15 Mbs) and outputs a 1920×1080 10 Mbs file $114_1$, a 1920×1080 9 Mbs file $114_2$, a 1920×1080 8 Mbs file $114_3$, a 1280×720 5 Mbs file $114_4$, a 1280×720 4 Mbs file $114_5$, a 1280×720 3 Mbs file $114_6$, a 720×480 2.2 Mbs file $114_7$, a 720×480 1.8 Mbs file $114_8$, a 720×480 1.4 Mbs file $114_9$, a 640×360 900 Kbs file $114_{10}$, a 400×224 600 Kbs file $114_{11}$, and a 400×224 300 Kbs file $114_{12}$.

The segmenting device 110 is configured to receive the files $114_1$, $114_2$, $114_3$, $114_4$, $114_5$, $114_6$, $114_7$, $114_8$, $114_9$, $114_{10}$, $114_{11}$, and $114_{12}$ and then segment each of the files $114_1$, $114_2$, $114_3$, $114_4$, $114_5$, $114_6$, $114_7$, $114_8$, $114_9$, $114_{10}$, $114_{11}$, and $114_{12}$ into multiple segmented files $116_{a1-n}$, $116_{b1-n}$, $116_{c1-n}$, $116_{d1-n}$, $116_{e1-n}$, $116_{f1-n}$, $116_{g1-n}$, $116_{h1-n}$, $116_{i1-n}$, $116_{j1-n}$, $116_{k1-n}$, and $116_{l1-n}$. Each of the segmented files $116_{a1-n}$, $116_{b1-n}$, $116_{c1-n}$, $116_{d1-n}$, $116_{e1-n}$, $116_{f1-n}$, $116_{g1-n}$, $116_{h1-n}$, $116_{i1-n}$, $116_{j1-n}$, $116_{k1-n}$, and $116_{l1-n}$ contains video and audio packets for a predetermined time duration (e.g., 10 seconds). It should be appreciated that the segmented files $116_{a1-n}$ have a higher quality (higher bit rate) than segmented files $116_{b1-n}$ which in turn have a higher quality (higher bit rate) than segmented files $116_{c1-n}$ and so on where the segmented files $116_{l1-n}$ have the lowest quality (lowest bit rate). The recording device $100c$ receives the multiple sets of segmented files $116_{a1-n}$, $116_{b1-n}$, $116_{c1-n}$, $116_{d1-n}$, $116_{e1-n}$, $116_{f1-n}$, $116_{g1-n}$, $116_{h1-n}$, $116_{i1-n}$, $116_{j1-n}$, $116_{k1-n}$, and $116_{l1-n}$ from the segmenting device 110. A detailed description is provided next on how the recording device $100c$ is configured to store these segmented files $116_{a1-n}$, $116_{b1-n}$, $116_{c1-n}$, $116_{d1-n}$, $116_{e1-n}$, $116_{f1-n}$, $116_{g1-n}$, $116_{h1-n}$, $116_{i1-n}$, $116_{j1-n}$, $116_{k1-n}$, and $116_{l1-n}$ to provide the network-based personal video recording service 102 for the users $104_1$, $104_2$, $104_3 \ldots 104_n$ in accordance with the second embodiment of the present invention.

The recording device $100c$ is shown as having a processor 118, a memory 120, multiple PVR storage units $122_1$, $122_2$, $122_3 \ldots 122_n$ and the general storage unit 124. The recording device $100c$ can have additional well-known components but for clarity only the components needed to explain the present invention are described herein. The recording device $100c$ is configured such that the processor 118 interfaces with the memory 120 and executes processor-executable instructions stored in the memory 120 to enable the following operations:

1. Receiving a record message $126_1$ from an end-user device $128_1$ (e.g., set-top-box computer, laptop computer, mobile phone (smart phone), tablet, internet capable television) associated with user $104_1$ (for example)(see FIG. 4C's receiving step $402c$). In practice, the recording device $100c$ would receive record messages $126_1$, $126_2$, $126_3 \ldots 126_n$ from the end-user devices $128_1$, $128_2$, $128_3$ ... $128_n$ (e.g., set-top-box computers, laptop computers, mobile phones (smart phones), tablets, internet capable televisions) respectively associated with users $104_1$, $104_2$, $104_3$ ... $104_n$. In this example, the record message $126_1$ contains a request to record the broadcast content 112 from 9:00 AM-9:30 AM for user $104_1$. The record message $126_2$ contains a request to record the broadcast content 112 from 9:00 AM-9:45 AM. The record message $126_3$ contains a request to record the broadcast content 112 from 9:20 AM-9:30 AM. And, the record message $126_n$ contains a request to record the broadcast content 112 from 9:08 AM-?? ... ??, where the user $104_n$ selected the record button on channel Z (broadcast content 112) at 9:08 AM and ?? ... ?? is when the user $104_n$ selects the stop button. In one embodiment, the recording device $100c$ can receive a "prescheduled" record message $126_1$ from user $104_1$ (or any other user $104_2$, $104_3$ ... $104_n$) where the "prescheduled" record message $126_1$ contains a request to record the broadcast content 112 in the future by indicating a particular start time and a particular end time.

2. Storing all of the sets of segmented files $116_{a1-n}$, $116_{b1-n}$, $116_{c1-n}$, $116_{d1-n}$, $116_{e1-n}$, $116_{f1-n}$, $116_{g1-n}$, $116_{h1-n}$, $116_{i1-n}$, $116_{j1-n}$, $116_{k1-n}$ and $116_{l1-n}$ corresponding to the requested broadcast content 112 within the network PVR $122_1$ associated with user $104_1$ and within the other network PVRs $122_2$, $122_3$ ... $122_n$ associated with users $104_2$, $104_3$ ... $104_n$ that also requested to record the broadcast content 112 (see FIG. 4C's storing step $404c$). In this example, the recording device $100c$ would store the segmented files $116_{a1-n}$, $116_{b1-n}$, $116_{c1-n}$, $116_{d1-n}$, $116_{e1-n}$, $116_{f1-n}$, $116_{g1-n}$, $116_{h1-n}$, $116_{i1-n}$, $116_{j1-n}$, $116_{k1-n}$ and $116_{l1-n}$ in the network PVR storage unit $122_1$ associated with user $104_1$ from 9:00 AM-9:30 AM. Plus, the recording device $100c$ would store the segmented files $116_{a1-n}$, $116_{b1-n}$, $116_{c1-n}$, $116_{d1-n}$, $116_{e1-n}$, $116_{f1-n}$, $116_{g1-n}$, $116_{h1-n}$, $116_{i1-n}$, $116_{j1-n}$, $116_{k1-n}$ and $116_{l1-n}$ in the network PVR storage unit $122_2$ associated with user $104_2$ from 9:00 AM-9:45 AM. In addition, the recording device $100c$ stores the segmented files $116_{a1-n}$, $116_{b1-n}$, $116_{c1-n}$, $116_{d1-n}$, $116_{e1-n}$, $116_{f1-n}$, $116_{g1-n}$, $116_{h1-n}$, $116_{i1-n}$, $116_{j1-n}$, $116_{k1-n}$ and $116_{l1-n}$ in the network PVR storage unit $122_3$ associated with user $104_3$ from 9:20 AM-9:30 AM. The recording device $100c$ also stores the segmented files $116_{a1-n}$, $116_{b1-n}$, $116_{c1-n}$, $116_{d1-n}$, $116_{e1-n}$, $116_{f1-n}$, $116_{g1-n}$, $116_{h1-n}$, $116_{i1-n}$, $116_{j1-n}$, $116_{k1-n}$, and $116_{l1-n}$ in the network PVR storage unit $122_n$ associated with user $104_n$ from 9:08 AM-?? ... ??. Once, user $104_n$ stops the recording of the broadcast content 112 then the recording device $100c$ stops storing the segmented files $116_{a1-n}$, $116_{b1-n}$, $116_{c1-n}$, $116_{d1-n}$, $116_{e1-n}$, $116_{f1-n}$, $116_{g1-n}$, $116_{h1-n}$, $116_{i1-n}$, $116_{j1-n}$, $116_{k1-n}$ and $116_{l1-n}$ in the network PVR storage unit $122_n$ associated with user $104_n$. At the same time the recording device $100c$ is performing storing step $404c$ it is also generating manifests $130_1'$, $130_2'$, $130_3'$ ... $130_n'$ respectively for users $104_1$, $104_2$, $104_3$ ... $104_n$. The manifests $130_1'$, $130_2'$, $130_3'$ ... $130_n'$ respectively have individual references $132_{1-x}$ to each of the segmented files $116_{a1-n}$, $116_{b1-n}$, $116_{c1-n}$, $116_{d1-n}$, $116_{e1-n}$, $116_{f1-n}$, $116_{g1-n}$, $116_{h1-n}$, $116_{i1-n}$, $116_{j1-n}$, $116_{k1-n}$, and $116_{l1-n}$ associated with the broadcast content 112 in the corresponding network PVR storage units $122_1$, $122_2$, $122_3$ ... $122_n$ for time periods of 9:00 AM-9:30 AM for user $104_1$, 9:00 AM-9:45 AM for user $104_2$, 9:20 AM-9:30 AM for user $104_3$, and 9:08 AM-?? ... ?? for user $104_n$.

3. Once the recording sessions stop for all of the users $104_1$, $104_2$, $104_3$ ... $104_n$ who had requested to record the broadcast content 112 then the recording device $100c$ performs following operations (see FIG. 4C's step $406c$):

3a. Identifying common segmented files that have been stored in the network PVR $122_1$ associated with the user $104_1$ and in the other network PVRs $122_2$, $122_3$ ... $122_n$ associated with other users $104_2$, $104_3$ ... $104_n$ (see FIG. 4C's step $406c1$).

3b. Determining which of the users $104_1$, $104_2$, $104_3$ ... $104_n$ that has longest recording session for the broadcast content 112 (see FIG. 4C's step $406c2$). In this example, assume user $104_2$ has the longest recording session for the broadcast content 112.

3c. Deleting all of the identified common segmented files except for one set of segmented files $116_{l1-n}$ (for example) which are stored in the network PVRs $122_1$, $122_3$ ... $122_n$ (not PVR $122_2$) associated with the users $104_1$, $104_3$ ... $104_n$ that did not have the longest recording session for the broadcast content 112 (see FIG. 4C's step $406c3$).

4. Re-writing the unique manifests $130_1'$, $130_3'$ ... $132_n'$ associated with users $104_1$, $104_3$ ... $104_n$ that did not have the longest recording session for the broadcast content 112 (see FIG. 4C's step $408c$). In this example, the re-written unique manifest $130_1$ has references $132_{1-x}$ to (1) segmented files associated with the one set of segmented files $116_{l1-n}$ which are stored in the network PVR storage unit $122_1$ associated with user $104_1$, and (2) to at least a portion of the identified common segmented files $116_{a1-n}$, $116_{b1-n}$, $116_{c1-n}$, $116_{d1-n}$, $116_{e1-n}$, $116_{f1-n}$, $116_{g1-n}$, $116_{h1-n}$, $116_{i1-n}$, $116_{j1-n}$, $116_{k1-n}$ which are stored in the network PVR storage unit $122_2$ associated with user $104_2$ that has the longest recording session (note: the at least a portion of the identified common segmented files do not include the one set of segmented files which are stored in the network PVR storage unit $122_1$ associated with user $104_1$). Further, the re-written unique manifest $130_3$ has references $132_{1-x}$ to (1) segmented files associated with the one set of segmented files $116_{l1-n}$ which are stored in the network PVR storage unit $122_3$ associated with user $104_3$, and (2) to at least a portion of the identified common segmented files $116_{a1-n}$, $116_{b1-n}$, $116_{c1-n}$, $116_{d1-n}$, $116_{e1-n}$, $116_{f1-n}$, $116_{g1-n}$, $116_{h1-n}$, $116_{i1-n}$, $116_{j1-n}$, $116_{k1-n}$ which are stored in the network PVR storage unit $122_2$ associated with user $104_2$ that has the longest recording session (note: the at least a portion of the identified common segmented files do not include the one set of segmented files which are stored in the network PVR storage unit $122_3$ associated with user $104_3$). Plus, the re-written unique manifest $130_n$ has references $132_{1-x}$ to (1) segmented files associated with the one set of segmented files $116_{l1-n}$ which are stored in the network PVR storage unit $122_n$ associated with user $104_n$, and (2) to at least a portion of the identified common segmented files $116_{a1-n}$, $116_{b1-n}$, $116_{c1-n}$, $116_{d1-n}$, $116_{e1-n}$, $116_{f1-n}$, $116_{g1-n}$, $116_{h1-n}$, $116_{i1-n}$, $116_{j1-n}$, $116_{k1-n}$ which are stored in the network PVR storage unit $122_2$ associated with user $104_2$ that has the longest recording session (note: the at least a portion of the identified common segmented files do not include the one set of segmented files which are stored in the network PVR storage unit $122_n$ associated with user $104_n$). The manifest $130_2'$ for user $104_2$ would not be re-written.

5. Sending the unique manifest $130_1$ to the end-user device $128_1$ associated with user $104_1$ (see FIG. 4C's step $410c$). In this example, the recording device $100c$ also sends unique manifests $130_2'$, $130_3$ ... $130_n$ to the end-user devices $128_2$, $128_3$ ... $128_n$ associated with users $104_2$, $104_3$ ... $104_n$ (note: the unique manifest $130_n$ would be sent to user $104_n$ upon the completion of the recording process which is when user $104_n$ stops the recording). FIG. 4A graphically illustrates steps 1-5 while FIG. 4B graphically illustrates the following steps 6-9.

6. Receiving a play-back message $136_1$ from the end-user device $128_1$ associated with user $104_1$ (see FIG. 4C's receiving step $412c$). The play-back message $136_1$ includes one of the references $132_1$ (for example) in the unique manifest $130_1$. FIG. 4B illustrates the recording device $100c$ receiving the play-back message $136_1$ from the end-user device $128_1$ associated with user $104_1$. For clarity, the recording device $100a$ shown in FIG. 4B does not illustrate the recording device $100a$ receiving play-back messages $136_2$, $136_3$ . . . $136_n$ from end-user devices $128_2$, $128_3$ . . . $128_n$ associated with users $104_2$, $104_3$ . . . $104_n$. In addition, FIG. 4B does not illustrate the recording device $100a$ interacting with and streaming the requested segmented files of the recorded broadcast content 112 to the end-user devices $128_2$, $128_3$ . . . $128_n$ associated with users $104_2$, $104_3$ . . . $104_n$. However, it should be appreciated that the recording device $100a$ interacts with and streams the requested segmented files of the recorded broadcast content 112 to the end-user devices $128_2$, $128_3$ . . . $128_n$ associated with users $104_2$, $104_3$ . . . $104_n$ in the same manner as it does with user $104_1$.

7. Using the one reference $132_1$ in the play-back message $136_1$ to retrieve a corresponding segmented file $116_{a1}$ (for example) from either the PVR storage unit $122_1$ associated with user $104_1$ or from PVR storage unit $122_3$ depending on which storage unit $122_1$ or $122_3$ is actually storing the requested segmented file $116_{a1}$ (see FIG. 4C's step $414c$). In this example, the recording device $100c$ would retrieve the segmented file $116_{a1}$ from PVR storage unit $122_2$ since it is not stored in the PVR storage unit $122_1$ associated with user $104_1$. This is a marked-improvement over the prior art since the PVR storage unit $122_1$ no longer has to store all of the segmented files $116_{a1-n}$, $116_{b1-n}$, $116_{c1-n}$, $116_{d1-n}$, $116_{e1-n}$, $116_{f1-n}$, $116_{g1-n}$, $116_{h1-n}$, $116_{i1-n}$, $116_{j1-n}$, $116_{k1-n}$.

8. Sending the retrieved segmented file $116_{a1}$ to the end-user device $128_1$ associated with user $104_1$ (see FIG. 4C's sending step $416c$).

9. Repeating the second receiving operation (step 6) by receiving play-back messages $136_2$, $136_3$, $136_4$ . . . $136_n$ with references $132_2$, $132_3$, $132_4$ . . . $132_n$ the using operation (step 7) to retrieve segmented files $116_{b2}$, $116_{b3}$, $116_{c4}$ . . . $116_{jn}$ (for example), and the second sending operation (step 8) by sending the retrieved segmented files $116_{b2}$, $116_{b3}$, $116_{c4}$ . . . $116_{jn}$ of the broadcast content 112 in a sequential manner to the end-user device $128_1$ associated with user $104_1$ (see FIG. 4C's repeating step $418c$).

9. Deleting the (1) one set of segmented files $116_{f1-n}$ (for example) which are stored in the specific PVR storage unit $122_1$ associated with user $104_1$, and (2) the remaining sets of segmented files $116_{a1-n}$, $116_{b1-n}$, $116_{c1-n}$, $116_{d1-n}$, $116_{e1-n}$, $116_{f1-n}$, $116_{g1-n}$, $116_{h1-n}$, $116_{i1-n}$, $116_{j1-n}$, $116_{k1-n}$ which are stored in the PVR storage unit $122_2$ (assuming all other users $104_2$, $104_3$ . . . $104_n$ have deleted the recorded broadcast content 112) after receiving a delete request $139_1$ from user $104_1$ (see FIG. 4C's deleting step $420c$).

Note: The description above relates to providing the network-based personal video recording service 102 for one user $104_1$ but it should be appreciated that the same steps can be performed by the recording device $100c$ to provide the network-based personal video recording service 102 for any number of users $104_1$, $104_2$, $104_3$ . . . $104_n$ each of which have their own end-user device $128_1$, $128_2$, $128_3$ . . . $128_n$ and each of which can record the same broadcast content 112 (e.g., channel Z) or different broadcast content (e.g., channels A-Y) at the same time or different times.

In view of the foregoing description, one skilled in the art will readily appreciate that the present invention is a marked improvement over the state-of-the-art since for each user $104_1$, $104_2$, $104_3$ . . . $104_n$ who wishes to record broadcast content 112 the recording device 110 records at a minimum a single bit rate (segmented files $116_{k1-n}$) of the broadcast content 112 within each user's network PVR storage unit $122_1$, $122_2$, $122_3$ . . . $122_n$. The recording device 100 also stores the other bit rates (segmented files $116_{a1-n}$, $116_{b1-n}$, $116_{c1-n}$, $116_{d1-n}$, $116_{e1-n}$, $116_{f1-n}$, $116_{g1-n}$, $116_{h1-n}$, $116_{i1-n}$, $116_{j1-n}$, $116_{k1-n}$) in a central storage location 124 (first and second embodiments) or some other storage location (third embodiment). In any embodiment, the users $104_1$, $104_2$, $104_3$ . . . $104_n$ are confined to only viewing broadcast content 112 that they have individually recorded (should they only record ten minutes of a program then that is all they can see). The recording device 100 has many advantages some of which are as follows (for example):

The recording device 100 eliminates certain inefficiencies by keeping one network copy (single bit rate) for each user $104_1$, $104_2$, $104_3$ . . . $104_n$ in their respective network PVR storage unit $122_1$, $122_2$, $122_3$ . . . $122_n$ while still keeping to existing laws.

The recording devices $100a$ and $100b$ also keeps the "user initiated" clause of existing laws.

The recording device $100a$ has the advantage of allowing complex and robust behavior in a single system with the least amount of waste by storing only manifest data and a single bitrate (one set of segmented files) in each network PVR storage unit $122_1$, $122_2$, $122_3$ . . . $122_n$.

Although multiple embodiments of the present invention have been illustrated in the accompanying Drawings and described in the foregoing Detailed Description, it should be understood that the invention is not limited to the disclosed embodiments, but instead is also capable of numerous rearrangements, modifications and substitutions without departing from the present invention that as has been set forth and defined within the following claims.

The invention claimed is:

1. A recording device for providing a network-based personal video recording service for a plurality of users, the recording device comprising:
   a plurality of personal video recorder storage units;
   a processor; and
   a memory that stores processor-executable instructions, wherein the processor interfaces with the memory to execute the processor-executable instructions, whereby the recording device is operable to:
   receive a record message from an end-user device associated with one user of the plurality of users, wherein the record message contains a request to record a broadcast content;
   store a plurality of sets of segmented files associated with the broadcast content, wherein each one of the sets of segmented files has a bitrate that is different than bitrates of the remaining sets of the segmented files;
   generate a unique manifest for the one user, wherein the unique manifest has references to segmented files associated with (1) one of the sets of segmented files stored in one of the personal video recorder storage units associated with the one user, and (2) the remaining sets of segmented files stored in a storage unit other than the personal video recorder storage unit associated with the one user; and
   send the unique manifest to the end-user device associated with the one user.

2. The recording device of claim 1, wherein the recording device is further operable to:

receive a play-back message from the end-user device of the one user, wherein the play-back message includes one of the references in the unique manifest;
use the one reference in the play-back message to retrieve a corresponding segmented file from either the personal video recorder storage unit associated with the one user or from the storage unit;
send the retrieved segmented file to the end-user device; and
repeat the second receive operation, the use operation, and the second send operation to provide requested segmented files of the recorded broadcast content in a sequential manner to the end-user device.

3. The recording device of claim 1, wherein the recording device is further operable to:
delete the one set of segmented files stored in the personal video recorder storage unit associated with the one user, and the remaining sets of segmented files which are stored in the storage unit.

4. The recording device of claim 1, wherein:
the storage unit is a general storage unit; and
the recording device is further operable such that after receipt of the record message the store operation is started where the one of the sets of segmented files are stored in the personal video recorder storage unit associated with the one user, and when not already being stored begin to store the remaining sets of segmented files in the general storage unit.

5. The recording device of claim 4, wherein the record message contains a prescheduled record request to record the broadcast content during a particular start time and end time.

6. The recording device of claim 4, wherein the recording device is further operable to perform the store operation as follows:
determine, upon receiving the record message from the end-user device of the one user, whether the broadcast content is currently being stored in the general storage unit;
based on a result of the determining operation being no, begin to store the remaining sets of segmented files of the broadcast content in the general storage unit;
after beginning to store the remaining sets of segmented files of the broadcast content in the general storage unit or based on a result of the determine operation being yes, begin to store the one of the sets of segmented files of the broadcast content in the personal video recorder storage unit associated with the one user; and
after beginning to store the one of the sets of segmented files of the broadcast content in the personal video recorder storage unit associated with the one user, increment a general recording count for the broadcast content to indicate number of users recording the broadcast content.

7. The recording device of claim 4, wherein the recording device is further operable to stop the store operation as follows:
determine, after an end time has been reached for recording the broadcast content for the one user, whether a general recording count is at one indicating that the one user is the only user that was recording the broadcast content;
based on a result of the determine operation being yes, stop the storing of the remaining sets of segmented files in the general storage unit;
after the stopping of the storing of the remaining sets of segmented files in the general storage unit or based on a result of the determine operation being no, stop the storing of the one of the sets of segmented files in the personal video recorder storage unit associated with the one user; and
after the stopping of the storing of the one of the sets of segmented files in the personal video recorder storage unit associated with the one user, stop the generation of the unique manifest for the one user, and decrement the general recording count by one for the broadcast content.

8. The recording device of claim 4, wherein the recording device is further operable to:
receive a delete message from the end-user device associated with the one user, wherein the delete message contains a request to delete the recorded broadcast content associated with the one user;
delete the unique manifest of the one user;
delete the one set of segmented files stored in the personal video recorder storage unit associated with the one user;
determine whether the one user has permission for stored segmented files in the general storage unit that none of the remaining users can access;
based on a result of the determine operating being yes, delete the stored segmented files in the general storage unit that none of the remaining users can access; and
based on a result of the determine operating being no, do not delete the stored segmented files in the general storage unit that none of the remaining users can access.

9. The recording device of claim 1, wherein:
the storage unit is a general storage unit; and
the recording device is operable such that before receiving the record message at least the remaining sets of segmented files are already being stored in the general storage unit, and after receiving the record message the one of the sets of segmented files are started to be stored in the personal video recorder storage unit associated with the one user.

10. The recording device of claim 1, wherein:
the storage unit is one of the personal video recorder storage units which is not associated with the one user;
the recording device is further operable to:
the store operation includes storing the plurality of sets of segmented files in the personal video recorder storage unit associated with the one user and in one or more of the personal video recorder storage units associated with one or more other users that also requested to record the broadcast content;
after recording sessions stop for the one user and the one or more other users that requested to record the broadcast content then:
identify common segmented files that have been stored in the personal video recorder storage unit associated with the one user and in the one or more of the personal video recorder storage units associated with one or more other users;
determine which of the one user or the one or more other users that has longest recording session for the broadcast content;
delete all of the identified common segmented files except for the one of the sets of segmented files which are stored in the personal video recorder storage units associated with the one user or the one or more other uses that did not have the longest recording session for the broadcast content; and the generate operation includes re-writing the unique manifest associated with the one user when the one user is not the user that has the longest recording session for the broadcast content such that the re-written unique manifest has references to segmented files associated with the one set of segmented files which are stored in the personal video recorder storage unit associated with the one user, and such that the re-written unique manifest has references to at least a portion of the identified common segmented files which are stored in the personal video recorder storage unit associated with the user that has the longest recording session, wherein the at least a portion of the identified common segmented files do not include the one set of segmented files which are stored in the personal video recorder storage unit associated with the one user.

11. A method implemented in a recording device for providing a network-based personal video recording service for a plurality of users, wherein the recording device comprises a plurality of personal video recorder storage units, the method comprising:
receiving, by the recording device, a record message from an end-user device associated with one user of the plurality of users, wherein the record message contains a request to record a broadcast content;
storing, by the recording device, a plurality of sets of segmented files associated with the broadcast content, wherein each one of the sets of segmented files has a bitrate that is different than bitrates of the remaining sets of the segmented files;
generating, by the recording device, a unique manifest for the one user, wherein the unique manifest has references to segmented files associated with (1) one of the sets of segmented files stored in one of the personal video recorder storage units associated with the one user, and (2) the remaining sets of segmented files stored in a storage unit other than the personal video recorder storage unit associated with the one user; and
sending, by the recording device, the unique manifest to the end-user device associated with the one user.

12. The method of claim 11, further comprising:
receiving, by the recording device, a play-back message from the end-user device of the one user, wherein the play-back message includes one of the references in the unique manifest;
using, by the recording device, the one reference in the play-back message to retrieve a corresponding segmented file from either the personal video recorder storage unit associated with the one user or from the storage unit;
sending, by the recording device, the retrieved segmented file to the end-user device; and
repeating, by the recording device, the second receiving step, the using step, and the second sending step to provide requested segmented files of the recorded broadcast content in a sequential manner to the end-user device.

13. The method of claim 11, further comprising:
deleting, by the recording device, the one set of segmented files stored in the personal video recorder storage unit associated with the one user, and the remaining sets of segmented files which are stored in the storage unit.

14. The method of claim 11, wherein:
the storage unit is a general storage unit; and
after receiving the record message, the storing step is started such that the one of the sets of segmented files are stored in the personal video recorder storage unit associated with the one user, and beginning to store the remaining sets of segmented files in the general storage unit when the remaining sets of segmented files are not already being stored in the general storage unit.

15. The method of claim 14, wherein the record message contains a prescheduled record request to record the broadcast content during a particular start time and end time.

16. The method of claim 14, wherein the storing step further comprises:
determining, by the recording device upon receiving the record message from the end-user device of the one user, whether the broadcast content is currently being stored in the general storage unit;
based on a result of the determining step being no, beginning to store the remaining sets of segmented files of the broadcast content in the general storage unit;
after beginning to store the remaining sets of segmented files of the broadcast content in the general storage unit or based on a result of the determining step being yes, beginning to store the one of the sets of segmented files of the broadcast content in the personal video recorder storage unit associated with the one user; and
after beginning to store the one of the sets of segmented files of the broadcast content in the personal video recorder storage unit associated with the one user, incrementing a general recording count for the broadcast content to indicate number of users recording the broadcast content.

17. The method of claim 14, wherein the storing step is stopped as follows:
determining, after an end time has been reached for recording the broadcast content for the one user, whether a general recording count is at one indicating that the one user is the only user that was recording the broadcast content;
based on a result of the determining step being yes, stopping the storing of the remaining sets of segmented files in the general storage unit;
after the stopping of the storing of the remaining sets of segmented files in the general storage unit or based on a result of the determining step being no, stopping the storing of the one of the sets of segmented files in the personal video recorder storage unit associated with the one user; and
after the stopping of the storing of the one of the sets of segmented files in the personal video recorder storage unit associated with the one user, stopping the generation of the unique manifest for the one user, and decrementing the general recording count by one for the broadcast content.

18. The method of claim 14, further comprising a step of deleting, by the recording device, the stored broadcast content by:
receiving a delete message from the end-user device associated with the one user, wherein the delete message contains a request to delete the recorded broadcast content associated with the one user;
deleting the unique manifest of the one user;
deleting the one set of segmented files stored in the personal video recorder storage unit associated with the one user;
determining whether the one user has permission for stored segmented files in the general storage unit that none of the remaining users can access;

based on a result of the determining step being yes, deleting the stored segmented files in the general storage unit that none of the remaining users can access; and based on a result of the determining step being no, do not delete the stored segmented files in the general storage unit that none of the remaining users can access.

19. The method of claim 11, wherein:

the storage unit is a general storage unit; and before receiving the record message, storing at least the remaining sets of segmented files in the general storage unit and after receiving the record message starting to store the one of the sets of segmented files in the personal video recorder storage unit associated with the one user.

20. The method of claim 11, wherein:

the storage unit is one of the personal video recorder storage units which is not associated with the one user;

the storing operation includes storing the plurality of sets of segmented files in the personal video recorder storage unit associated with the one user and in one or more of the personal video recorder storage units associated with one or more other users that also requested to record the broadcast content;

after recording sessions stop for the one user and the one or more other users that requested to record the broadcast content then:

identifying common segmented files that have been stored in the personal video recorder storage unit associated with the one user and in the one or more of the personal video recorder storage units associated with one or more other users;

determining which of the one user or the one or more other users that has longest recording session for the broadcast content;

deleting all of the identified common segmented files except for the one of the sets of segmented files which are stored in the personal video recorder storage units associated with the one user or the one or more other uses that did not have the longest recording session for the broadcast content; and the generating step includes re-writing the unique manifest associated with the one user if the one user is not the user that has the longest recording session for the broadcast content such that the re-written unique manifest has references to segmented files associated with the one set of segmented files which are stored in the personal video recorder storage unit associated with the one user, and such that the re-written unique manifest has references to at least a portion of the identified common segmented files which are stored in the personal video recorder storage unit associated with the user that has the longest recording session, wherein the at least a portion of the identified common segmented files do not include the one set of segmented files which are stored in the personal video recorder storage unit associated with the one user.

21. A device comprising:

a processor; and a memory that stores processor-executable instructions, wherein the processor interfaces with the memory to execute the processor-executable instructions, whereby the device is operable to:

generate a unique manifest for a user, wherein the unique manifest is associated with a broadcast content requested by the user, wherein the broadcast content comprises a plurality of sets of segmented files, wherein each set of the segmented files has a bitrate that is different than bitrates of the remaining sets of the segmented files, wherein the unique manifest has references to the plurality of sets of segmented files, and wherein the references are associated with (1) one set of segmented files stored in a personal video recorder storage unit associated with the user, and (2) the remaining sets of segmented files stored in a storage unit other than the personal video recorder storage unit associated with the user.

* * * * *